(12) United States Patent
Cayford

(10) Patent No.: US 6,560,532 B2
(45) Date of Patent: May 6, 2003

(54) METHOD AND SYSTEM FOR ELECTRONICALLY DETERMINING DYNAMIC TRAFFIC INFORMATION

(75) Inventor: Randall Cayford, Pleasant Hill, CA (US)

(73) Assignee: Regents of the University of California, The, Oakland, CA (US)

( * ) Notice: Subject to any disclaimer, the term of this patent is extended or adjusted under 35 U.S.C. 154(b) by 0 days.

(21) Appl. No.: 10/061,784

(22) Filed: Jan. 31, 2002

(65) Prior Publication Data

US 2002/0177947 A1 Nov. 28, 2002

Related U.S. Application Data

(60) Provisional application No. 60/293,829, filed on May 25, 2001.

(51) Int. Cl.$^7$ .............................................. G06F 15/50
(52) U.S. Cl. ..................... 701/209; 701/202; 701/211; 340/990; 340/995
(58) Field of Search ............................... 701/210, 209, 701/201, 202, 207, 208, 211, 117, 118, 119; 342/357.13; 340/990, 995

(56) References Cited

U.S. PATENT DOCUMENTS

| | | | | |
|---|---|---|---|---|
| 4,999,783 A | * | 3/1991 | Tenmoku et al. ............ | 701/205 |
| 5,109,344 A | * | 4/1992 | Kakihara et al. ............ | 340/990 |
| 5,270,937 A | * | 12/1993 | Link et al. ................... | 340/995 |
| 5,436,840 A | * | 7/1995 | Lam et al. ................... | 340/988 |
| 5,610,821 A | * | 3/1997 | Gazis et al. ................. | 340/990 |
| 5,812,069 A | * | 9/1998 | Albrecht et al. ............ | 340/905 |
| 5,948,042 A | * | 9/1999 | Heimann et al. ............ | 701/117 |
| 5,995,023 A | * | 11/1999 | Kreft .......................... | 340/988 |
| 6,154,152 A | * | 11/2000 | Ito .............................. | 340/988 |
| 6,381,533 B1 | * | 4/2002 | Crane et al. ................. | 340/988 |
| 6,405,128 B1 | * | 6/2002 | Bechtolsheim et al. ..... | 340/988 |

* cited by examiner

Primary Examiner—William A. Cuchlinski, Jr.
Assistant Examiner—Eric M Gibson
(74) Attorney, Agent, or Firm—Morrison & Foerster LLP

(57) ABSTRACT

A method of and system for determining a path traveled by a vehicle in a road network having a plurality of road segments connected into a plurality of paths that includes obtaining a current location measurement having an accuracy range, determining the road segments located within this accuracy range of the current location measurement to form a set of current possible positions for the vehicle, retrieving a set of stored possible paths for the vehicle, generating a new set of possible paths based on the set of current possible positions and the set of stored possible paths, and storing the new set of possible paths as the set of stored possible paths.

56 Claims, 14 Drawing Sheets

500

| 1 | 4 | 8 | 12 |
|---|---|---|---|
| A | AC<br>AB | ACC<br>ABE<br>ABEG<br>ABEF | ABEF<br>ABEFH<br>ABEFI |
| B | ABE<br>ABD<br>BB | BBE<br>BBEF<br>BBEG | BBEF<br>BBEFH<br>BBEFI<br>BBEFH<br>BBEFI |
|   | BE | BEE<br>BEG<br>BEF | BEFF<br>BEFH<br>BEFI |
| C | BD<br>CC | CCC |  |

502

METHOD AND SYSTEM FOR ELECTRONICALLY DETERMINING DYNAMIC TRAFFIC INFORMATION

CROSS-REFERENCE TO RELATED APPLICATIONS

The present application claims priority of an earlier filed provisional application U.S. Ser. No. 60/293,829, entitled METHOD AND SYSTEM FOR ELECTRONICALLY DETERMINING DYNAMIC TRAFFIC INFORMATION, filed on May 25, 2001, the entire content of which is incorporated herein by reference.

BACKGROUND

1. Field of the Invention

The present invention generally relates to a system and method for determining dynamic traffic information. More particularly, the present invention relates to generating dynamic traffic information based on locational measurements.

2. Description of the Related Art

Two kinds of traffic information have traditionally been gathered: qualitative data and quantitative data. Qualitative data is typically gathered through reports from traffic helicopters or traveler call-ins. Quantitative data is usually gathered by public agencies, such as state departments of transportation, via fixed installation surveillance systems. The most common fixed installation surveillance systems use inductive loops embedded in roadways. These systems can be expensive to install and can require expensive, on-going maintenance.

Other kinds of surveillance systems that use radar guns, microwaves, video surveillance, or electronic toll tags have been proposed or are in development. All of these surveillance systems typically have high installation costs because they require equipment to be installed along the roads. Additionally, these surveillance systems typically have high operating costs due to ongoing maintenance costs and the cost of bandwidth needed to transmit signals from the surveillance systems to a central office. Furthermore, these surveillance systems typically require installation on public property, which limits the ability of private companies to install and operate such surveillance systems. Because surveillance systems are typically expensive to install and operate, use of these systems is typically limited to freeway or highway surveillance only.

One alternative to fixed installation surveillance systems uses probes, such as electronic devices, to gather quantitative data about the vehicles in which the probes are located. However, such probe systems have traditionally faced two primary limitations. The first limitation is a lack of sufficient numbers of probes from which to gather information. In particular, insufficient numbers of probes limits the ability of a system to generate information for large numbers of streets. The second limitation is the difficulty of determining the particular roads on which the probe travels. More particularly, the difficulty of placing a vehicle on a particular road can limit the accuracy of the information gathered about the vehicle.

The recent development of location systems for determining the position of a cellular phone or other electronic device addresses the first limitation and allows for the development of a probe system with much greater capabilities than previously possible. In particular, tracking the increasing number of cell phones can overcome the first limitation of insufficient numbers of probes. By tracking cell phones, a probe system can track thousands of probes simultaneously over a local road network.

However, with the current location systems available, the second limitation, the difficulty of determining the particular roads on which the probe travels, is a major problem. Current systems typically can only locate a phone within a radius of about 50 meters to about 300 meters, depending on the technology used, atmospheric conditions, and the specific location of the phone. Accordingly, locating a phone using current systems presents a serious challenge for a probe system because a radius of about 300 meters can include a very large number of roads. Furthermore, present approaches to probe systems generally depend on knowing the location of the vehicle to within about 5 meters to about 10 meters.

SUMMARY

The present invention relates to a method of and system for determining a path traveled by a vehicle in a road network having a plurality of road segments connected into a plurality of paths. In one embodiment of the present invention, a current location measurement having an accuracy range is obtained for a vehicle. Road segments located within this accuracy range of the current location measurement are then determined to form a set of current possible positions for the vehicle. Next, a set of stored possible paths for the vehicle are retrieved. A new set of possible paths are then generated based on the set of current possible positions and the set of stored possible paths. The new set of possible paths are then stored as the set of stored possible paths.

In another embodiment, a system configured to determine a path traveled by a vehicle along road segments in a road network includes a processor and a database. The processor can be configured to receive a current location measurement for the vehicle, determine the road segments located within this accuracy range of the current location measurement to form a set of current possible positions for the vehicle, and generate a new set of possible paths based on the set of current possible positions and a set of stored possible paths for the vehicle. The database can be configured to store a set of stored possible paths for the vehicle, and store a new set of possible paths as the set of stored possible paths.

DESCRIPTION OF THE DRAWING FIGURES

The present invention can be best understood by reference to the following detailed description taken in conjunction with the accompanying drawing figures, in which like parts may be referred to by like numerals:

DETAILED DESCRIPTION

The present invention provides a method and apparatus for determining dynamic traffic information. In the following description, numerous details are set forth in order to enable a thorough understanding of the present invention. However, it will be understood by those of ordinary skill in the art that these specific details are not required in order to practice the invention. Further, well-known elements, devices, process steps and the like are not set forth in detail in order to avoid obscuring the present invention.

Although the invention has been described in conjunction with particular embodiments, it will be appreciated that various modifications and alterations may be made by those skilled in the art without departing from the spirit and scope of the invention. The invention is not to be limited by the foregoing illustrative details, but rather is to be defined by the appended claims.

Figure 1:
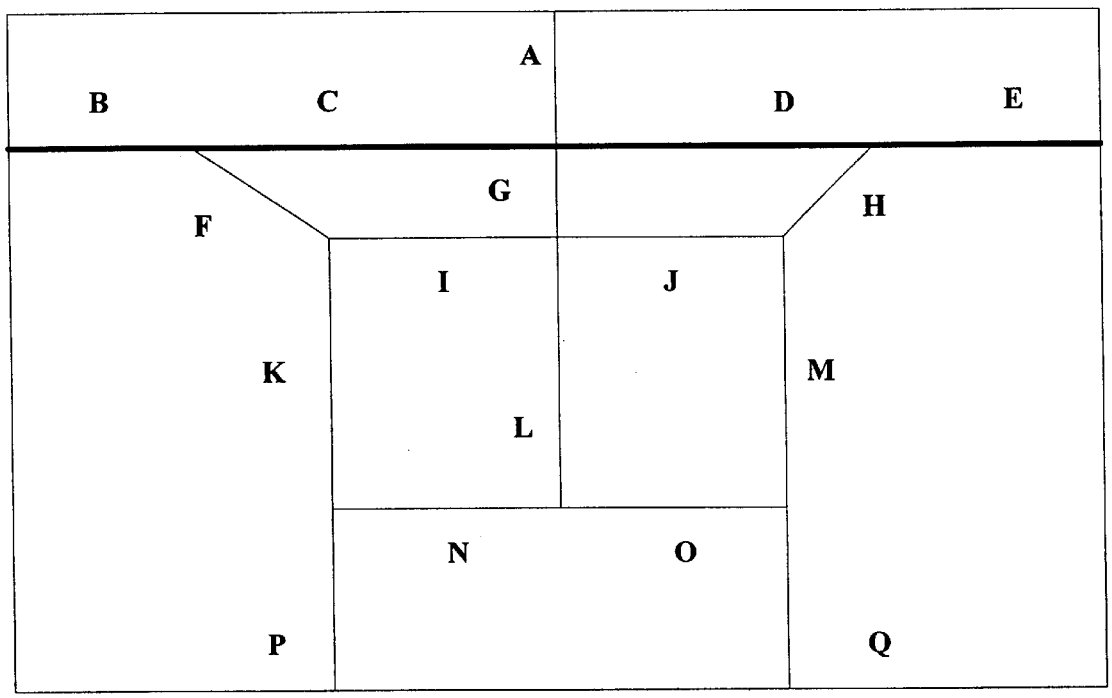
FIG. 1 shows an exemplary road network that can be used with the present invention.

With reference to FIG. 1, an exemplary road network 100 is shown. Road network 100 can include road segments A, B, C, D, E, F, G, H, I, J, K, L, M, N, O, P, and Q, each of which can be defined as a segment of road between two points. These points can be associated with interruptions in a road, such as where two roads meet (e.g., intersections), where two roads cross (e.g., bridges or tunnels), where a lane is added to or removed from a freeway, and the like. In an urban area, road segments can generally be short, on the order of 100 meters.

Each road segment can have information associated with it, such as its geographical location to within about 10 meters to about 20 meters, and characteristics such as curves in the road segment, whether a road segment is one-way, and the like. Presently, commercial map data can provide a geographical location to within about 10 meter to about 20 meter accuracy. Furthermore, this commercial map data can be used to generate a road network 100 having road segments. As described below with regard to FIG. 11, this commercial map data can be used to produce road network data 302.

In addition, each road segment can have a minimum travel time associated with it, which corresponds to the minimum amount of time that a vehicle can travel over the road segment. For instance, road segments having turns, traffic signals, interruptions, and the like, may have longer minimum travel times than road segments located on a freeway, highway, and the like. However, road segments may not have minimum travel times associated with them in all applications.

According to various embodiments of the present invention, traffic information can be generated for road network 100. As described below with regard to various embodiments of the present invention, traffic information can be generated by aggregating the movements of a large number of electronic devices associated with vehicles, such as cellular phones, Global Positioning System (GPS) receivers, and the like, or vehicles themselves based on positional measurements. Furthermore, with regard to various embodiments of the present invention, this traffic information can be generated based on positional measurements of arbitrary accuracy.

Figure 2:
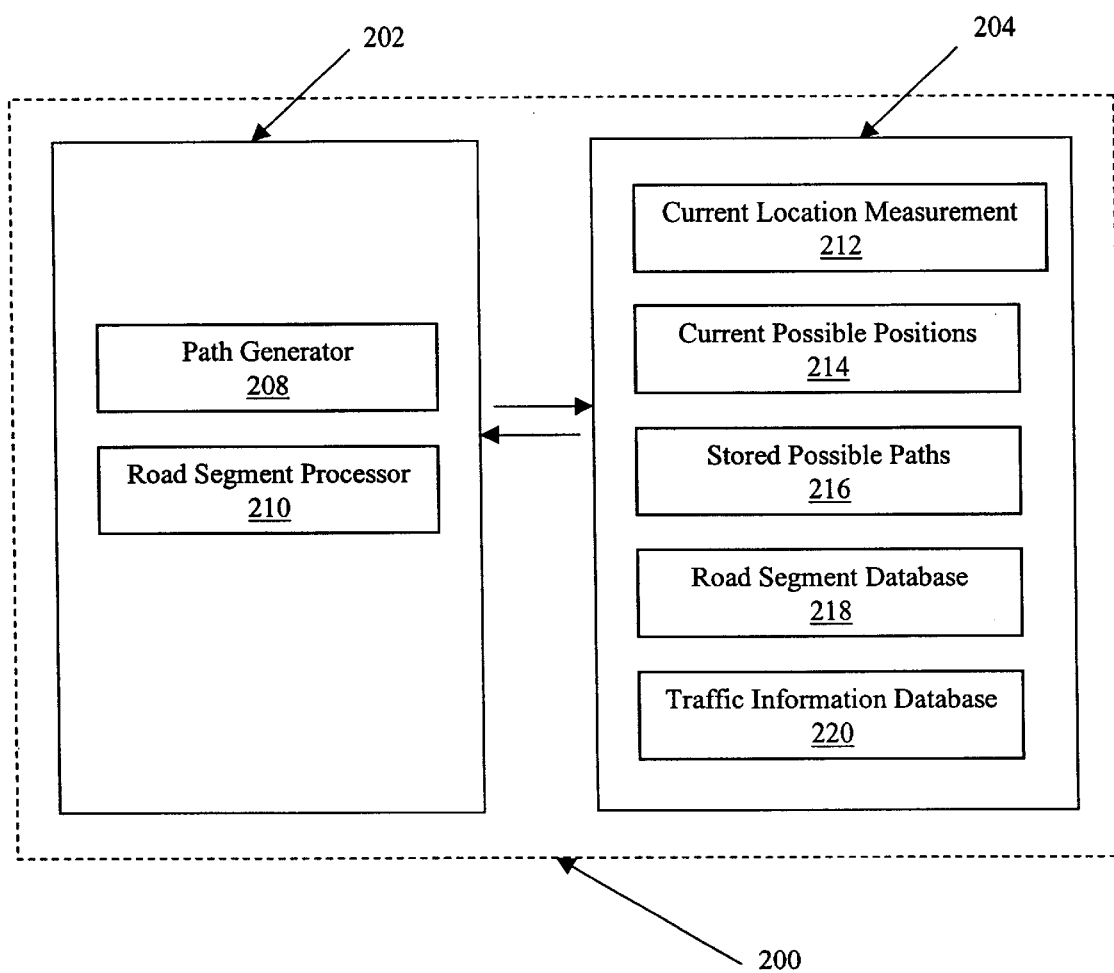
FIG. 2 depicts an exemplary embodiment of a system that can be used to generate traffic information.

With reference to FIG. 2, an exemplary embodiment of a system 200 that can be used to generate traffic information is shown. System 200 can include processor 202 and database 204. Processor 202 can include various processing capabilities and sub-processors, such as path generator 208, road segment processor 210, and the like, as described more fully below. However, it should be recognized that each of these sub-processors and processing capabilities can be configured as separate processors in some applications.

In the present embodiment, database 204 can store various kinds of data, such as the data included in current location measurement 212, current possible positions 214, stored possible paths 216, road segment database 218, traffic information database 220, and the like, as described more fully below. However, it should be recognized that the above data can be stored in separate databases in some applications.

Figure 3:
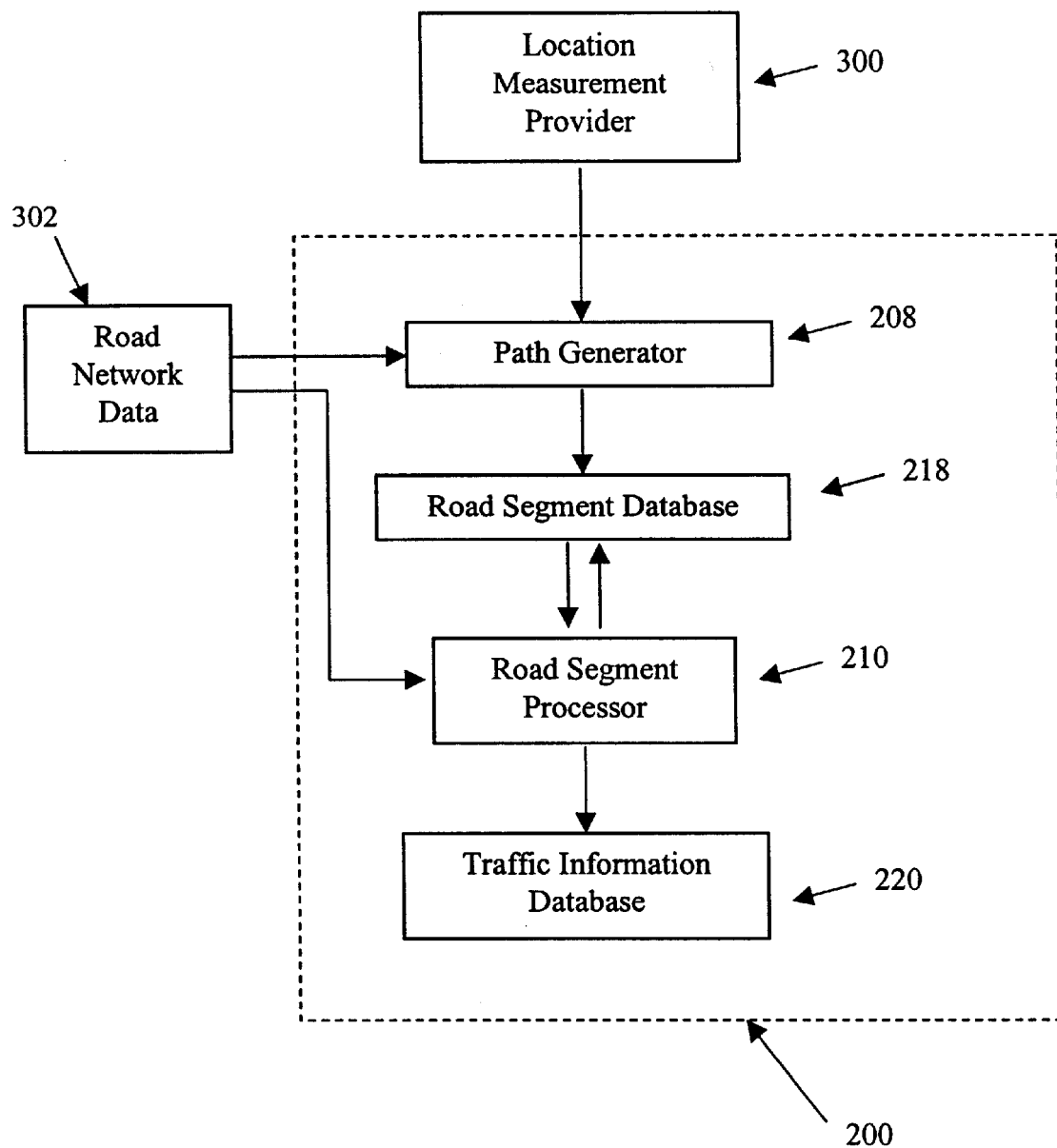
FIG. 3 is a flow chart depicting another exemplary embodiment of a system that can be used to generate traffic information.

With reference to FIG. 3, an exemplary embodiment of system 200 is shown along with location measurement provider 300 and road network data 302. In particular, location measurement provider 300 can provide a current location measurement 212 (FIG. 2) to path generator 208 in system 200. Location measurement provider 300 can use various devices and methods to provide current location measurement 212. However, current location measurement 212 can be received and processed by system 200 independent of the devices and methods used by location measurement provider 300 to obtain current location measurement 212.

Some examples of devices that location measurement provider can use to obtain current location measurement 212 can include cellular phones, in-vehicle navigation systems having two-way communications, and the like. For example, an in-vehicle navigation system can be used that includes a GPS receiver and a wireless radio modem that can report a current position back to a base station.

Location measurement provider 300 can use various methods to obtain current location measurements 212. One exemplary method, commonly associated with cellular phones, that can be used to obtain current location measurement 212 is through signal profiling, in which the unique characteristics of a received signal are compared against a database of previous measurements at known locations to calculate the position. Another exemplary well-known method of obtaining a current location measurement 212 includes using angle of arrival measurements, in which a signal from a vehicle is measured at two or more antennas, and the position of the vehicle is found by triangulation.

Another exemplary method that can be used to obtain a current location measurement 212 includes using time of arrival measurements, in which the location of a handset is determined by comparing the trip times transmitted from the handset to two or more base stations. Additionally, another exemplary method includes using a GPS. In particular, a handset uses a GPS to locate itself and sends its location to a base station.

Each of the above-described methods have been used with cellular phones and other devices to provide locations of these devices. Accordingly, the above-described methods can be used with all of the major mobile telephone standards used for cellular phones, such as GSM, CDMA, 3rd generation networks, analog, and the like, with the exception of GPS-assisted location systems that require GPS-equipped handsets.

Other methods that can be used to obtain current location measurements include in-vehicle navigation systems, which typically use GPS for determining location, and vehicle identification systems, which typically use roadside detectors to identify a vehicle. Some vehicle identification systems can use video processing, electronic toll tags, and vehicle signatures measured using inductive loops, laser guns, and radar guns.

According to the present embodiment, current location measurements 212 can be obtained using one or a combination of the above-described methods, mobile telephone standards, and vehicle identification systems, or any other location system that can generate a series of locations for a vehicle. Each current location measurement 212 can include information such as identification of the vehicle (ID), a timestamp, x and y coordinates, and the like. However, it should be recognized that current location measurements 212 can include coordinates only or any combination of information about the vehicle or its location.

In the present embodiment, road network data 302 can be provided to path generator 208 in system 200. Road network data 302 can include information about road segments (FIG. 1) and connections between them.

Path generator 208 can use both road network data 302 and current location measurement 212 from location measurement provider 300 to generate a set of stored possible paths 216 (FIG. 2) that can be used to provide information about road segments (FIG. 1) traveled by a vehicle. Information regarding the road segments traveled by a vehicle can be stored in road segment database 218, which can also store information from multiple vehicles about various road segments.

In the present embodiment, because information about road segments obtained from one vehicle, such as travel time, may not necessarily be representative of information from a collection of vehicles traveling along the same road segments, information from road segment database 218 can be processed by road segment processor 210 to produce data such as average travel time for a road segment, median travel time for a road segment, distribution of travel times for a road segment, minimum travel time for a road segment, and the like. This data can be stored in traffic information database 220. Furthermore, the data in traffic information database can be continuously updated to reflect new data about a road segment such as average travel time for a road segment, median travel time for a road segment, distribution of travel times for a road segment, minimum travel time for a road segment, and the like, as new data is stored in road segment database 218 and processed by road segment processor 210.

Figure 4:
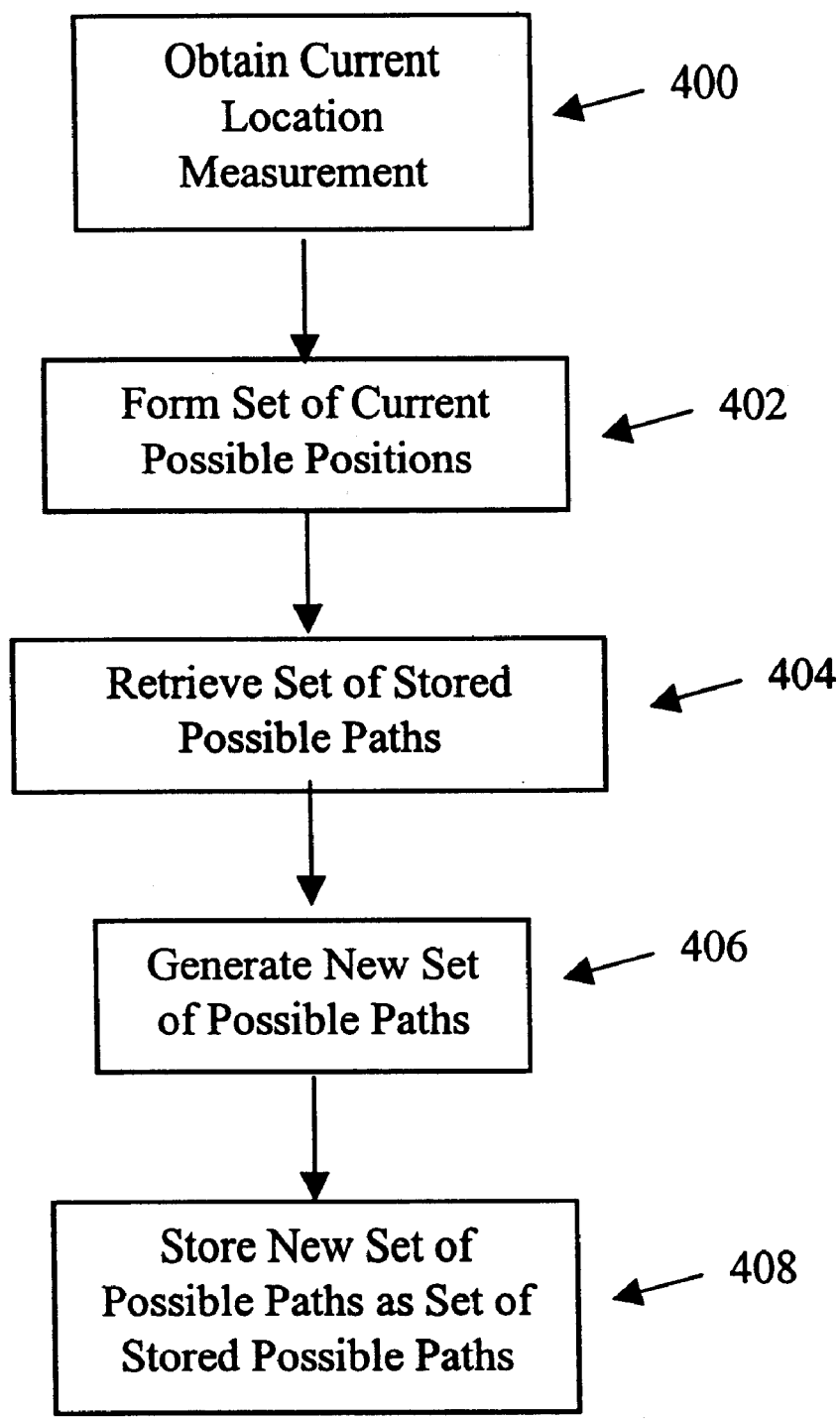
FIG. 4 is a flow chart depicting an exemplary embodiment of steps that can be performed by a path generator.

With reference to FIG. 4, an exemplary embodiment of steps that can be performed by path generator 208 are shown. Generally, path generator 208 can use a sequence of current location measurements 212 (FIG. 2) for a particular vehicle to determine the path traveled by the vehicle through a road network 100 (FIG. 1). More particularly, in step 400, current location measurement 212 (FIG. 2) having an accuracy range can be obtained from a location measurement provider 300 (FIG. 3).

Next, in step 402, road segments (FIG. 1) located within this accuracy range of current location measurement 212 can be determined and aggregated to form a set of current possible positions 402 for the vehicle. For example, road network data 302 (FIG. 3) can be searched to determine the road segments having at least one point located at a distance from the current location measurement 212 that is less than or equal to the specified accuracy.

Following step 402, a set of stored possible paths 216 (FIG. 2) can be retrieved in 404 from database 204 (FIG. 2) in step 404. This set of stored possible paths 216 can be used with the set of current possible positions 402 to generate a new set of possible paths in step 406.

Figure 5:
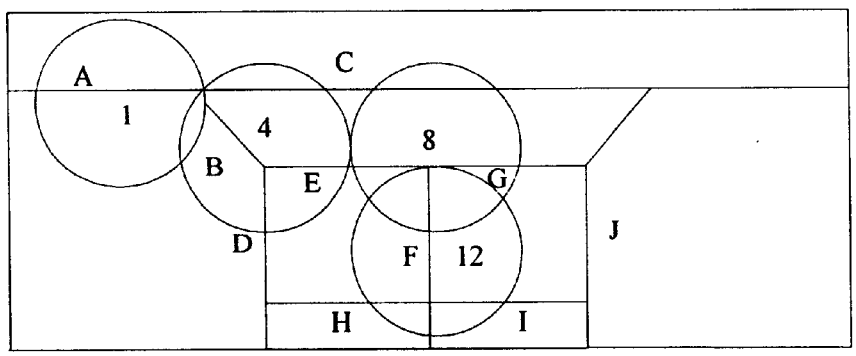
FIG. 5 is an exemplary map and table depicting a process of generating a new set of possible paths for a vehicle.

For example, with reference to FIG. 5, a new set of possible paths can be generated by obtaining a current location measurement 212 having a particular accuracy range at time 1. Road segments A, B, and C can be identified as road segments within this accuracy range and stored as a set of current possible positions (step 402). Because this is the first current location measurement 212 obtained in this example, each road segment can be stored in the set of stored possible paths 216.

In the current example, at time 4, current location measurement 212 having a particular accuracy range can be obtained. Road segments B, C, D and E can be identified as road segments within this accuracy range and stored as a set of current possible positions. The set of stored possible paths 216 can then be retrieved and each of these paths can be extended to each current possible position that can be reached from the path. More particularly, in the present example, starting from path A, the vehicle can move onto C, B, D by way of B, and E by way of B. Accordingly, path A can be extended to each of these road segments to create the new set of possible paths AB, AC, ABD and ABE. Furthermore, from path B, the vehicle can move onto road segments D and E, but the vehicle cannot move onto road segment C. Accordingly, path B can be extended to each of these road segments to create the new set of possible paths BB (since the vehicle may not have yet left link B), BD and BE. Moreover, from path C, the vehicle can only move onto C, so path C can be extended to become the new set of possible paths CC.

In the present example, the new set of possible paths is shown in the second column of the table in FIG. 5. This set includes AC, AB, ABE, ABD, BB, BE, BD, and CC, and can be saved as the set of stored possible paths. Next, at time 8, current location measurement 212 having a particular accuracy range can be obtained. Road segments C, E, F, and G can be identified as road segments within this accuracy range and stored as a set of current possible positions. The set of stored possible paths 216 can then be retrieved and each of these paths can be extended to each current possible position that can be reached from the path. More particularly, in the present example, a new set of possible paths can be generated as shown in the third column of the table in FIG. 5. Each of the paths from the second column can be extended except paths ABD and BD. From road segment D, the final road segment in path ABD, it is impossible to travel to links C, E, F, or G. Therefore, these paths are removed from the new set of possible paths. The new set of possible paths can be stored as the set of stored possible paths.

Figure 6:
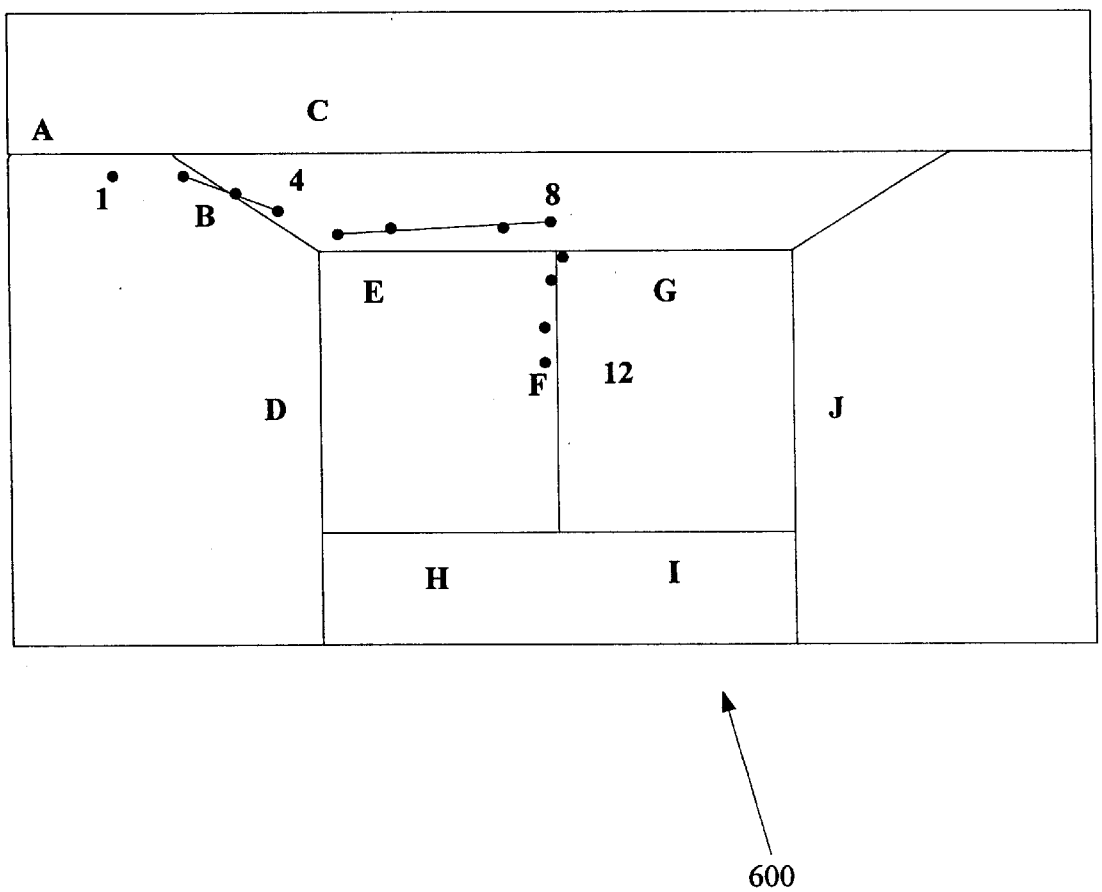
FIG. 6 depicts an exemplary graphical result of generating a path traveled by a vehicle.

Next, at time 12, current location measurement 212 having a particular accuracy range can be obtained. Road segments F, H, and I can be identified as road segments within this accuracy range and stored as a set of current possible positions. The set of stored possible paths 216 can then be retrieved and each of these paths can be extended to each current possible position that can be reached from the path. More particularly, in the present example, a new set of possible paths can be generated as shown in the fourth column of the table in FIG. 5. This process can be continued until a single path is stored in the set of stored possible paths, as shown graphically in FIG. 6. Referring back to FIG. 3, this single path can be stored in road segment database 218 and the road segments can be processed by road segment processor 210.

In another example, a new set of possible paths can be generated in step 406 by comparing the timestamps of the current location measurements obtained in step 400. In particular, the timestamp of the original current location measurement processed for the vehicle can be subtracted from the timestamp of the current location measurement. The difference is the available travel time. Next, a minimum travel time can be calculated for each sequence of road segments connecting the original current location measurement to the current location measurement. Each sequence having a minimum travel time that is less than the available travel time can be included in a new path. In particular, a new path can include the old path, the connecting sequence of road segments, and the current possible position. The newly created path may be added to the new set of possible paths.

Alternatively, a new set of possible paths can be generated in step 406 by subtracting the timestamp of a previous current location measurement processed for the vehicle from the current location measurement. The difference is the available travel time. Next, a minimum travel time can be calculated for each sequence of road segments connecting the previous current location measurement to the current location measurement. Each sequence having a minimum travel time that is less than the available travel time can be included in a new path. In particular, a new path can include the old path, the connecting sequence of road segments, and the current possible position. The newly created path may be added to the new set of possible paths.

For instance, with reference again to FIG. 5, the available time, or difference between timestamps 4 and 8, is 4 seconds. However, it is impossible to travel from D to links C, E, F, or G in this available time. Accordingly, these paths cannot be included in the new set of possible paths.

In the present example, if a path can be extended to reach more than one of the current possible positions, the path can be duplicated, and a copy can be extended to each of the current possible positions. These extended paths can be added to the new set of possible paths. If a path cannot be extended to reach any of the current possible positions, that path is discarded. The new set of possible paths can then be examined to see whether the vehicle's actual path can be determined.

In yet another example, a new set of possible paths can be generated in step 406 by using a combination of the examples described above. For any of the above examples, the process of generating a new set of possible paths can be repeated until a single path is stored in the set of stored possible paths, as shown graphically in FIG. 6. With reference again to FIG. 3, information about this single path can be stored in road segment database 218. In particular, information that can be stored about this single path can include a vehicle identification, a sequence of road segments in the single path, current possible positions used for path determination, and the like. However, it should be recognized that not all of the information listed above may be stored in some applications. Instead, any combination of the above listed information can be stored, as appropriate for the application. In addition, the process of generating a new set of possible paths can be performed for multiple vehicles and a single path for each of these multiple vehicles can be stored in road segment database 218.

The quantity of location measurements necessary to generate a single path depends on the accuracy of the current location measurements obtained. As the inaccuracy of the current location measurements increase, the quantity of current location measurements necessary can increase. For example, for a current location measurement obtained with a positional accuracy of about 0 to about 70 meters, a reasonable series of current location measurements can be obtained by taking measurements about every 2 to 5 seconds over about a 30-second interval. For a positional accuracy of about 80 to about 140 meters, the interval can be increased, with about 60 seconds being a reasonable length. For a positional accuracy of about 150 to about 300 meters, the interval can be increased to about 2 minutes or more in most cases. Accordingly, in one embodiment of the present invention, a current location measurement can be taken about every 2 seconds over about a 60 second interval.

According to an exemplary application of the present invention, current location measurements obtained with a positional accuracy of about 300 meters can be used to accurately determine paths. Thus, accurate results can be produced with the present invention even with highly inaccurate input data, in contrast to conventional mapping techniques that typically require at least about 10-meter, if not about 5-meter, accuracy.

In another exemplary application using about 10 meter accuracy and about 1-second sampling intervals, 99.5% of major surface streets in Alameda and Contra Costa Counties of California can be accurately mapped by tracking the path of a vehicle. Using an accuracy range of about 70 meters and about 1-second sampling intervals, 92% of major surface streets in these counties can be accurately mapped by tracking the path of a vehicle. Furthermore, even when the accuracy range is increased to about 190 meters, 75% of major surface streets can be accurately mapped by tracking the path of a vehicle.

Figure 7:
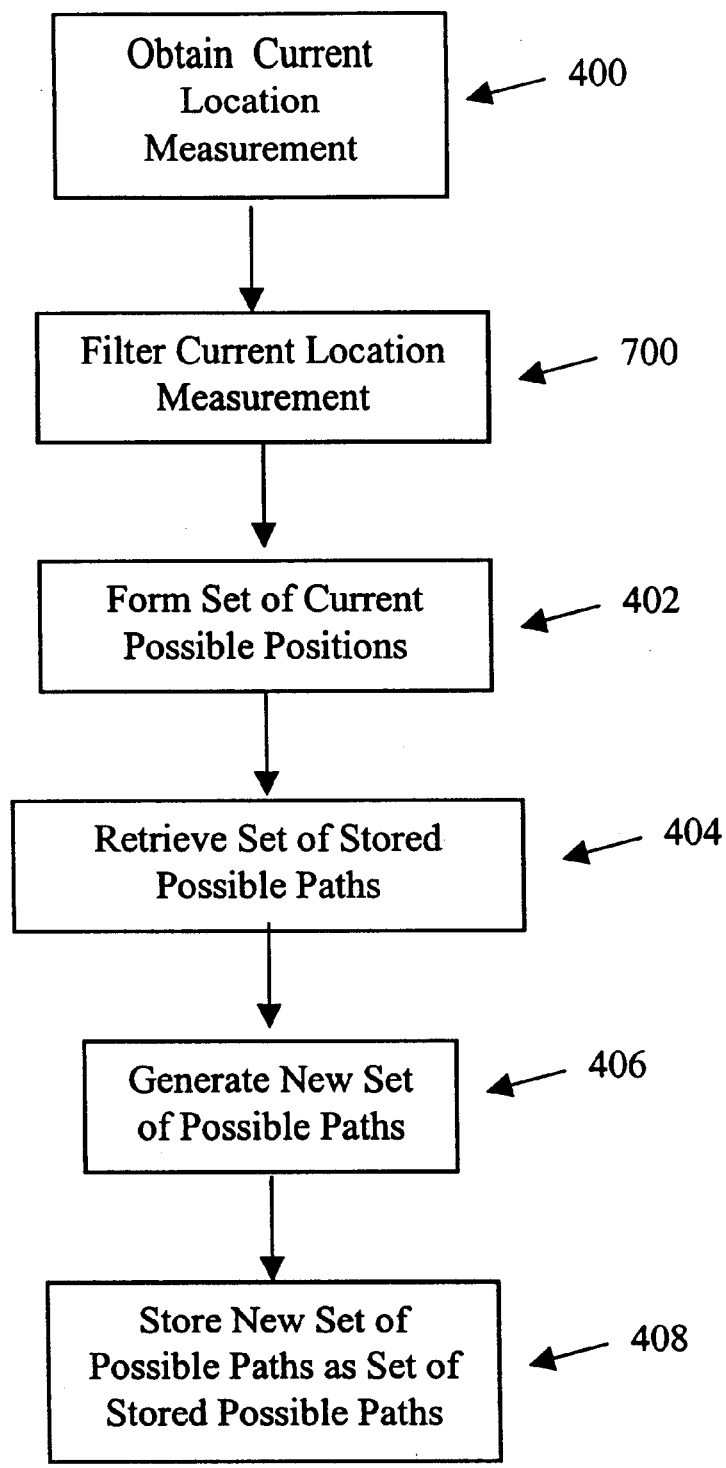
FIG. 7 is a flow chart depicting another exemplary embodiment of steps that can be performed by a path generator.
Figure 8:
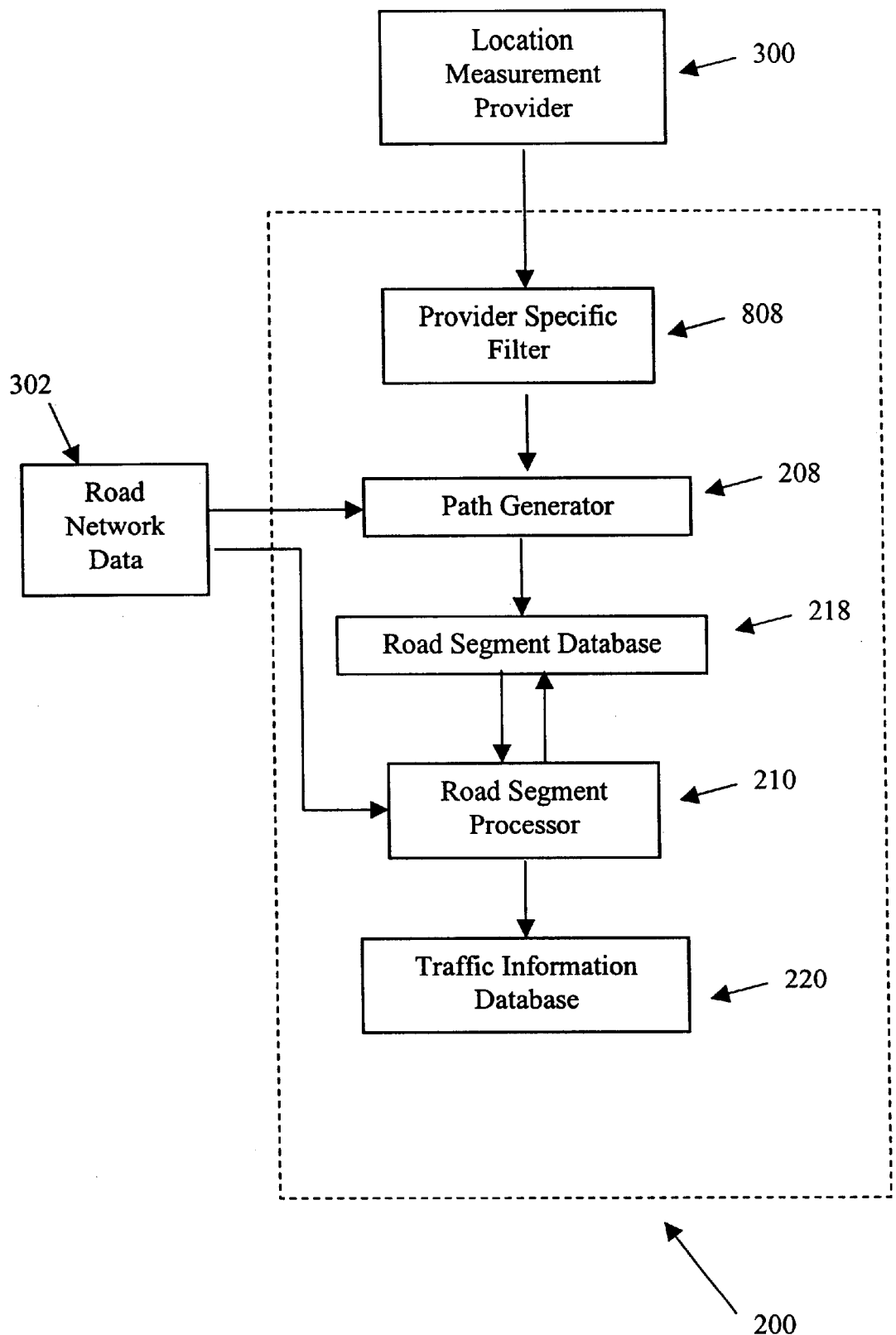
FIG. 8 is a flow chart depicting another exemplary embodiment of a system that can be used to generate traffic information.

With reference now to FIG. 7, another exemplary embodiment of steps that can be performed by path generator 208 (FIG. 3) are shown. The present embodiment is similar in many respects to the embodiment shown in FIG. 4, except that the present embodiment includes filtering a current location measurement in step 700. Although this filtering can be performed by path generator 208, it can also be performed by a provider specific filter 808, as shown in FIG. 8.

With reference again to FIG. 7, after a current location measurement has been obtained in step 400, it can be filtered in step 700. In one configuration, filtering can be performed for each current location measurement obtained. Generally, the filter used in step 700 can be specific to the current location measurement provider (FIG. 8) and can include a set of software routines that can perform tasks such as data transformation, assigning an accuracy value, preliminary error correction, data reduction, and the like. In some configurations, there may be many filter processes running on one or multiple machines.

In the present embodiment, the format of the current location measurement 212 (FIG. 2) obtained from location measurement provider 300 (FIG. 8) can differ depending on the technology and software used by the current location measurement provider. In particular, different current location measurement providers can provide different formats such as different sets of fields in current location measurement 212, different encoding of current location measurement 212 in order to transmit the information to system 200, and the like. Accordingly, the filter in step 700 can convert the current location measurements 212 from the location measurement provider's format into a common format. For example, current location measurements 212 can be converted such that they are referenced relative to a geodetic datum, such as the WGS84 datum used by the GPS system, and the like. Furthermore, the converted current location measurements 212 can be expressed in three-dimensional longitude and latitude.

Although not required to practice the current invention, converted current location measurements 212 can further be converted from three-dimensional longitude and latitude to two dimensions using a map projection. For example, current location measurements 212 generated relative to a WGS84 geodetic datum can be converted to two-dimensional current location measurements 212 by using a stereographic map projection centered on a geographical center point of the road network 100 (FIG. 1) being used.

In the present embodiment, filtering in step 700 can also include assigning an accuracy value to the current location measurement obtained in step 400. This accuracy value can be determined through empirical testing that is performed outside system 200 (FIG. 2) and is specific to a particular location measurement provider 300. Although empirical testing can be performed in many ways, one exemplary method can include comparing the current location measurements 212 obtained from a particular location measurement provider 300 with current location measurements 212 obtained from a source that uses a known technology. For example, the accuracy of current location measurements obtained from a test cell phone can be determined by tracking the test cell phone in a vehicle that is also equipped with a differential GPS receiver. In particular, the current location measurements collected from the test cell phone can be compared to the current location measurements collected by the differential GPS receiver. The differences between the current location measurements obtained from the test cell phone and differential GPS receiver can be used as an accuracy value for the test cell phone. In some cases, the accuracy value can be variable even for a single location measurement provider 300. Depending on the technology used by the location measurement provider 300 to obtain current location measurements, supplemental information about each current location measurement can be obtained, such as signal strength, number of base stations used, and the like. This supplemental information can be used to assign separate accuracy values to each current location measurement 212 obtained from the location measurement provider 300.

In the present embodiment, filtering in step 700 can also include eliminating faulty current location measurements. In some configurations, filtering can be performed as each current location measurement is obtained, while in other configurations current location measurements obtained at different times can be filtered as a batch. An exemplary method that can be used to eliminate faulty current location measurements includes associating each current location measurement with previous location measurements from the same vehicle. In particular, a current location measurement can be added to a sequence of previous location measurements for a vehicle and a set of tests can be applied to determine if the current location measurement is faulty. For instance, if the current location measurement is too far away from the most recently obtained previous location measurement for the vehicle to have actually traveled between these positions at a reasonable speed, the current location measurement is faulty. In particular, if current location measurement B is 200 meters away from previous location measurement A, the difference between the timestamps for locations A and B is 1 second, and the accuracy is 50 meters, the vehicle must have traveled at least 100 meters per second to reach location B. Because this rate is unrealistic, location B can be labeled as a faulty current location measurement.

If a sequence of current location measurements are all marked as faulty or a large percentage of the recent current location measurements are marked as faulty, further testing can be applied to the set of current location measurements. After all current location measurements have been examined and after all of the current location measurements marked as faulty have been removed from the set, the set of current location measurements is assumed to be the correct sequence.

In the present embodiment, filtering in step 700 can also include eliminating current location measurements obtained from non-vehicle sources. In particular, because system 200 (FIG. 2) can process current location measurements from multiple vehicles and from various location measurement providers, some of the current location measurements may inadvertently include non-vehicle sources that may need to be eliminated in order to reflect accurate traffic information along the road network. Accordingly, non-vehicle sources can be eliminated by detecting sequences of current location measurements that exhibit uncharacteristic vehicle behavior. A primary method that can be used to detect uncharacteristic vehicle behavior is to determine whether the source is moving at a sufficient speed. If a source has not moved in several minutes or if it is traveling consistently at a very slow speed, for example, less than 3 mph, it can be removed from the set of sources used to provide current location measurements. In particular, a source can be removed by blocking the source's vehicle ID from system 200.

Although the present embodiment is described with various filter processes, it should be recognized that a single filter process or a combination of any of the filter processes can be used. Additionally, it should be recognized that filter processes may not be used in some applications.

Figure 9:
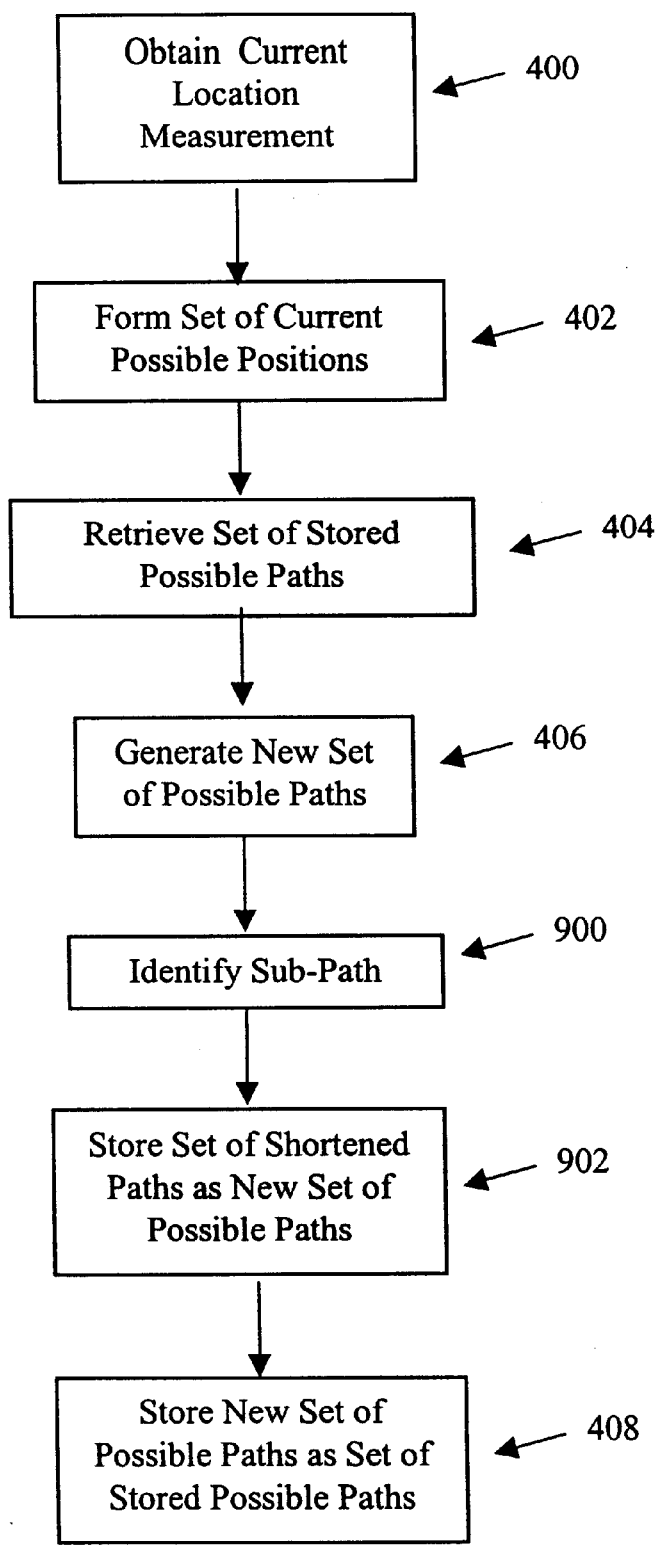
FIG. 9 is a flow chart depicting another exemplary embodiment of steps that can be performed by a path generator.

With reference now to FIG. 9, another exemplary embodiment of steps that can be performed by path generator 208 (FIG. 3) are shown. The present embodiment is similar in many respects to the embodiment shown in FIG. 4, except that the present embodiment includes identifying a sub-path in step 900 and storing a set of shortened paths as the new set of possible paths in step 902.

In particular, in step 900, the new set of possible paths generated in step 406 can be analyzed to determine whether there is a sequence of one or more road segments, such as a sub-path, that is common to all of the paths in the new set of possible paths. For instance, the new set of possible paths can be examined to determine if there are two road segments, a first common road segment and a second common road segment, that appear in all the paths. If so, these two road segments represent two known positions through which the vehicle passed. The road segments between these two known positions can then be examined to determine if these road segments are identical in each path in the new set of possible paths. If they are identical, there is a single common sub-path, and the sub-path can be stored in road segment database 218 (FIG. 3). Sub-paths from multiple vehicles can also be stored in road segment database 218. Although the above example describes two common road segments in a sub-path, it should be recognized that a single road segment that is common to all paths in the new set of possible paths can also form a sub-path.

After a sub-path is identified, all paths in the new set of possible paths can be shortened by removing all road segments in the paths prior to the last common road segment. For instance, if a sub-path includes a single common road segment, the road segments preceding this single common road segment can be removed. Additionally, if a sub-path includes at least two common road segments, the road segments preceding the last common road segment in the sub-path can be removed. In step 902, this set of shortened paths can then be saved as the new set of possible paths. Next, in step 408, the new set of possible paths can be stored as the set of stored possible paths.

With reference again to FIG. 5, table 502 shows a process of generating new sets of possible paths, including determining whether there is a sequence of road segments, such as a sub-path, that is common to all of the paths in the new set of possible paths. In particular, the new set of possible paths at time 1 does not include a sub-path that is common to all of the paths. Similarly, the new set of possible paths at times 4 and 8 do not include a sub-path that is common to all of the paths. However, the new set of possible paths at time 12 does contain a sub-path that is common to all of the paths. In particular, each path contains the sub-path BEF. Accordingly, this sub-path can be stored in road segment database 218, along with sub-paths from other vehicles. Furthermore, all paths can be shortened by removing the road segments prior to road segment F. Thus, the resulting set of shortened paths includes F, FH, and FI. This set of shortened paths can be stored as the new set of possible paths, and the new set of possible paths can be stored as the set of stored possible paths.

With reference again to FIG. 3, after a sub-path is stored in road segment database 218, road segment processor 210 can use this sub-path and associated information, such as current location measurements used to generate this sub-path, timestamps, and the like, to calculate travel times, speeds, and the like, on the road segments traversed by an individual vehicle. For instance, with reference again to FIG. 6, starting with the first road segment in the path traveled by a vehicle, the current location measurement closest to the starting end of the road segment can be selected. The timestamp for this current location measurement can then be subtracted from the timestamp corresponding to the current location measurement closest to the exiting end of the road segment to obtain the travel time for the vehicle across this road segment. The travel times and other calculations for various road segments along the path traveled by a vehicle can be stored in road segment database 218 or local memory, along with the travel times and other calculations for other vehicles along various road segments.

Because the current location measurements are unlikely to be located exactly at the end points of a road segment, the travel time calculated for a road segment can be normalized by scaling the distance between the current location measurements to the total length of the road segment. The timestamps corresponding to the current location measurements can also be normalized in a similar manner. Additionally, the average speed on a road segment can be calculated by dividing the length of the road segment by the travel time.

Furthermore, if the road segments traveled are short or the current location measurements are highly inaccurate, a resulting error in the travel time calculations and magnitude of error can be reduced by using a travel time across a series of road segments. For example, if a road segment in the path is shorter than a specified length, such as 10 times the accuracy of the location measurements, the road segment can be added to the next road segment in the path. This procedure can be repeated until the total length of the series of road segments reaches or exceeds the specified length. The travel time along the series of road segments can then be calculated by using the current location measurements closest to the starting end of the first road segment and the exiting end of the last road segment in the series.

In addition, when a travel time is calculated for a series of road segments as described above, this combined travel time can be normalized by scaling the times to the lengths of the road segments in the series. For example, the vehicle can be assumed to travel at a constant speed over the series of road segments, with travel time apportioned proportionally to the road segments in the series. In particular, if the travel time is calculated as 40 seconds across a series of three road segments, which includes a first road segment that is 100 meters long, a second road segment that is 200 meters long, and a third road segment that is 100 meters long, the travel time for the first road segment is 10 seconds, the travel time for the second road segment is 20 seconds, and the travel time for the third road segment is 10 seconds. This procedure can provide more accurate travel times for the individual road segments as the total length of the series of road segments increases because any error can be averaged over a longer distance.

Referring again to FIG. 3, the travel times and other calculations for various road segments along the path traveled by a vehicle can be stored in road segment database 218 or local memory, along with the travel times and other calculations for other vehicles along various road segments. The calculations can include information such as vehicle identification, entry time, exit time, travel time, average speed, and the like.

In the present embodiment, road segment processor 210 can use the calculations stored in road segment database 218 for multiple vehicles to generate overall calculations for the individual road segments in a road network. For each road segment, the calculations for each vehicle that traversed that road segment during an specified time interval can be gathered, and calculations such as average, median, distribution values, and the like, can be generated for both travel times and speeds on the road segment. In addition, delay can also be calculated for each road segment. For example, delay can be defined as the time difference between the current travel time on a particular road segment and the time a vehicle traveling at free flow speed would ideally take to traverse that road segment.

When information from multiple vehicles is used to generate calculations for a single road segment, road segment processor 210 can analyze the distribution of speeds for multiple vehicles along the road segment to identify whether two distinct peaks appear in the distribution. These distinct peaks can suggest that two different lanes exist in the road segment and that the traffic flow differs in these two lanes. For example, traffic flow in a carpool lane may differ from traffic flow in a mixed flow lane along the same road segment.

In the present embodiment, the final output from road segment processor 210 can be a database of traffic information for the road segments in a road network. This database of traffic information can be stored in traffic information database 220. Some examples of the kinds of information that can be stored in traffic information database 220 can include travel time across each road segment, average speed across each road segment, delay on each road segment, separate values for each lane on a multi-lane road segment, and the like. The information stored in traffic information database 220 can be used as an area wide map of current travel conditions on road segments within a road network. Accordingly, system 200 (FIG. 2) can be used to determine traffic conditions in the road network, such as the current time to travel between any two points in the road network.

Figure 10:
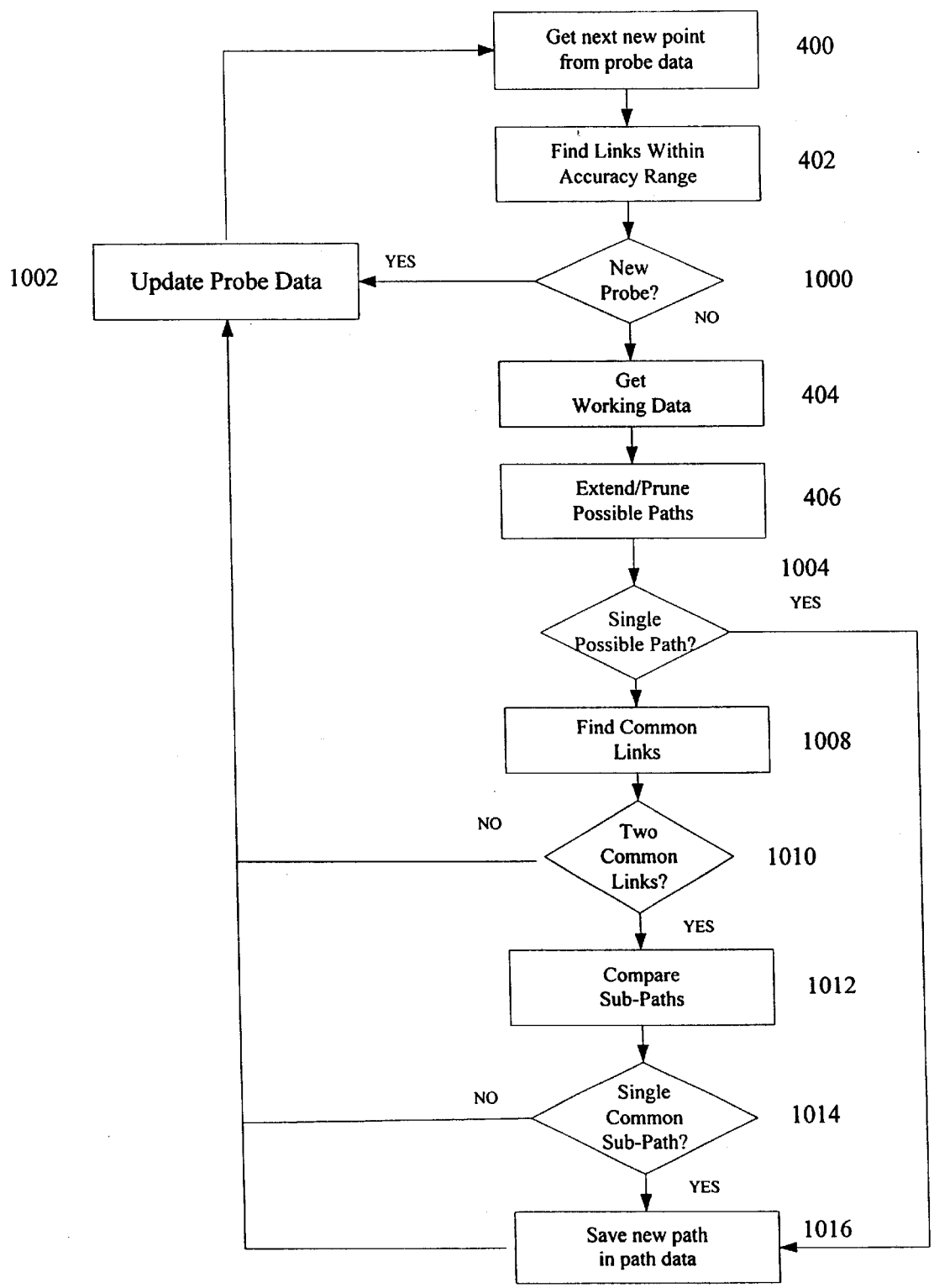
FIG. 10 is a flow chart depicting another exemplary embodiment of steps that can be performed by a path generator.

With reference now to FIG. 10, another exemplary embodiment of steps that can be performed by path generator 208 (FIG. 3) is shown. The present embodiment is similar in many respects to the embodiment shown in FIG. 4, except that the present embodiment includes an exemplary process for handling a first current location measurement for a vehicle, an exemplary process for handling the situation when a single possible path traveled by a vehicle is found, and an exemplary process for identifying a sub-path. Additionally, the current embodiment refers to a probe as the instrument or device, such as a cellular phone, GPS receiver, and the like, that can provide current location measurements to a location measurement provider. Furthermore, the current embodiment refers to road segments as links.

According to one aspect of the present embodiment, a process for handling a first current location measurement from a vehicle is depicted. In particular, a current location measurement, or new point, having an accuracy range can be obtained in step 400. Next, in step 402, the links in the road network having at least one point that is located within the accuracy range can be added to the set of current possible positions, and stored as probe data in step 1002. Probe data can be stored in memory or saved to a database until the next current location measurement is obtained for the probe. Each of the stored links can also be stored as an initial link in a set of stored possible paths in probe data.

According to the present aspect, if the current location measurement obtained in step 400 is not the first obtained from a particular probe, saved probe data can be retrieved in step 404. In step 406, each path in the set of stored possible paths can be compared to the set of current possible positions to determine if the path can be extended to each current possible position and added to the set of stored possible paths.

According to another aspect of the present embodiment, in step 1004, if the set of stored possible paths saved as probe data includes only a single path, that path can represent the actual movement of the probe and vehicle. This single path can then be stored in path data in step 1016, as described more fully below, for further processing by path processor 208 (FIG. 12), as described below.

According to yet another aspect of the present embodiment, in step 1004, if the set of stored possible paths in the saved probe data includes more than one path, the set of stored possible paths can be analyzed to determine if a common sub-path occurs in each of the paths. More particularly, in step 1008 common links appearing in each of the paths can be found. Next, in step 1010, if there are not at least two common links appearing in each of the paths, then probe data can be updated in step 1002 and processing pauses until another current location measurement is obtained for the probe. However, if there are at least two common links appearing in each of the paths, in step 1012, the sequence of road segments between the common links, or sub-path, is compared for each of the paths. If all of the sub-paths are identical, then a single common sub-path is found in step 1014 and this sub-path can be stored in path data in step 1016, as described more fully below. Additionally, this sub-path can be removed from each of the paths in the set of stored possible paths to form a set of shortened paths. These shortened paths can then be stored as the set of stored possible paths in probe data in step 1002.

Although various aspects are described with respect to the present embodiment, it should be recognized that any one of these aspects or any combination of these aspects can be used.

Figure 11:
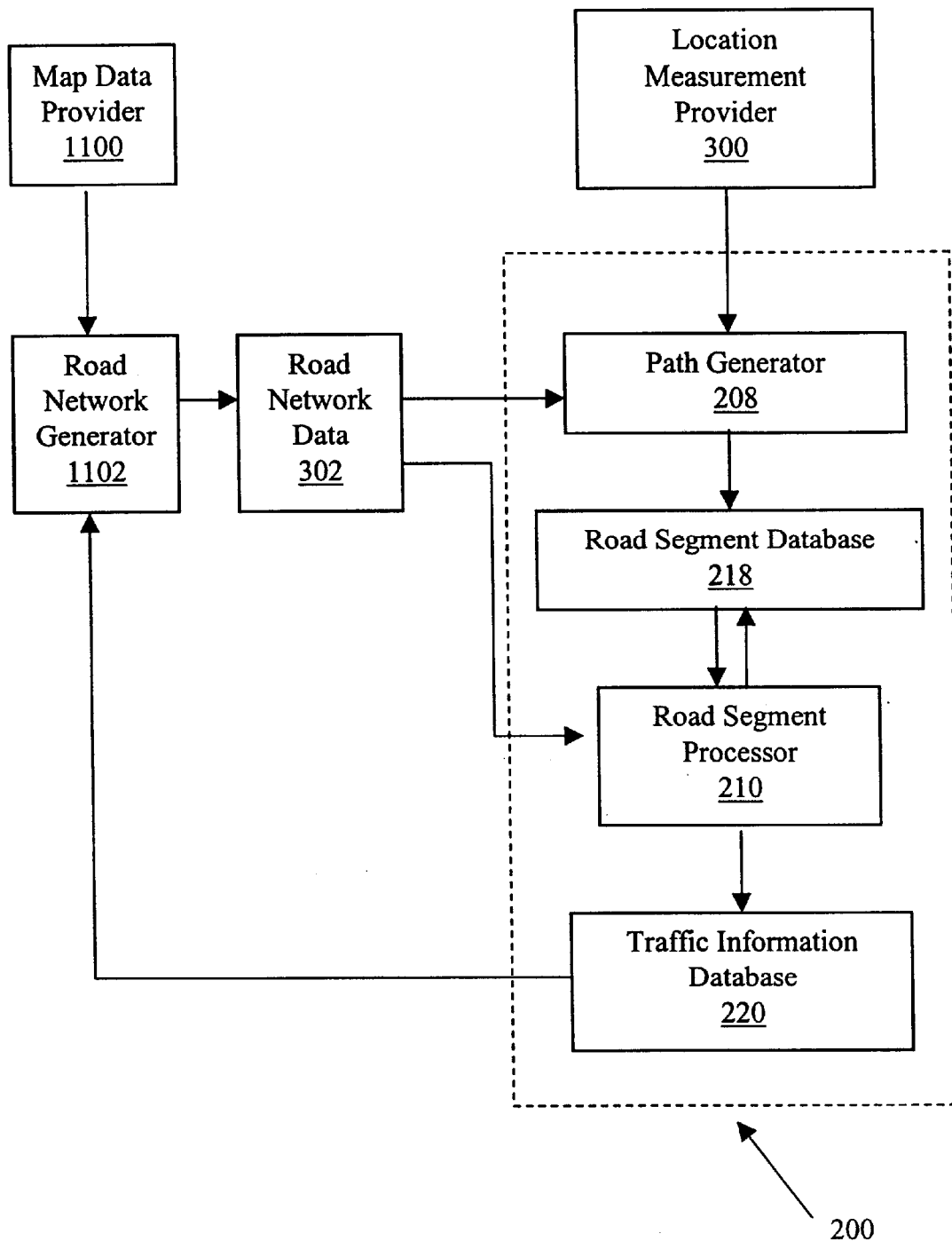
FIG. 11 is a flow chart depicting another exemplary embodiment of a system that can be used to generate traffic information.

With reference now to FIG. 11, another exemplary embodiment of a system 200 that can be used to generate traffic information is shown. This embodiment is similar to the embodiment shown in FIG. 3, except that road network generator 1102 can be used to produce road network data 302. In particular, road network generator 1102 can build the data structures in road network data 302 that can be subsequently used by path generator 208 and road segment processor 210.

Road network generator 1102 can first define the set of road segments in the road network. Then, road network generator 1102 can determine the connections between road segments over which vehicles can travel. For example, if a vehicle is traveling in a particular direction on a road segment, road network generator 1102 can determine the set of road segments onto which the vehicle can move. More particularly, if the vehicle is traveling towards endpoint A of a road segment having endpoints A and B, road network generator 1102 can examine all other road segments in the road network to determine if they have an endpoint located within 5 meters of endpoint A. If so, road network generator 1102 can add these road segments to a set of possible connecting road segments.

In addition, each road segment in the set of possible connecting road segments can be examined to determine if there are conditions that would prevent a vehicle traveling along the original road segment towards endpoint A to move onto that road segment. More particularly, road network generator 1102 can use information about the road segments, such as whether they are one-way or two-way, whether a particular road crossing is an overpass or tunnel, and the like, to determine whether the vehicle can travel from the original road segment to the possible connecting road segment. Accordingly, if a vehicle cannot travel through endpoint A onto a possible connecting road segment, road network generator 1102 can remove this possible connecting road segment from the set. For example, if the original road segment is one-way from endpoint A to endpoint B, there are no possible connecting road segments for endpoint A since a vehicle may not travel from the original road segment through endpoint A and onto any other road segment.

In the present embodiment, once road network generator 1102 examines all road segments in the set of possible connections and removes the non-connections, the remaining road segments in the set are those road segments that connect to endpoint A of the original road segment. Road network generator 1102 can then repeat this process for endpoint B.

In the present embodiment, once road network generator 1102 determines the set of connections between road segments, road network generator 1102 can calculate the minimum time for a vehicle to traverse each road segment. The minimum time for a road segment can be based on factors such as the length of the road segment, whether the road segment is a freeway road segment or a surface street, and the like. Furthermore, time penalties may be added at particular connections. The time penalties can be based on the angle of movement when traveling from one road segment to another. For example, a 180-degree turn movement may require the addition of 3–6 seconds to the minimum travel time, whereas a 15-degree turn to the right may implicate no turn penalty. Other reasonable penalties for different movements may be determined empirically by an outside system. In addition, time dependent network connections can be added to road network data 302. These connections can indicate movements between road segments that are allowed at certain times of day and not at other times.

After road network data 302 is generated, road network generator 1102 can then pass the completed road network data 302 to path generator 208, as needed. In one configuration, road network generator 1102 can organize the road segments into a spatially oriented data structure, such as a quadtree, in which each rectangle in the quadtree contains a pointer-based linked list of road segments that cross that rectangle. For instance, the data structure for each road segment can include two linked lists, one for each endpoint of the road segment, each list containing the connecting road segments.

In some configurations, information from traffic information database 220 can be used to update the information in road network data 302. For instance, road network generator 1102 can use information from traffic information database 220 to add new connections between road segments in the road network. Obtaining updated information from traffic information database 220 in this manner can reduce the need to update information from map data provider 1100 on a periodic basis. However, it should be recognized that information from traffic information database may not be used by road network generator in some applications.

In addition, although the above describes road network generator 1102 as generating road network data 302, road network generator 1102 may not be necessary in some applications. In particular, when information from map data provider 1100 can be used directly as road network data 302, road network generator 1102 can be omitted. Furthermore, although road network generator 1102 is not shown as part of system 200, road network generator 1102 can be included in system 200 in some applications.

Figure 12:
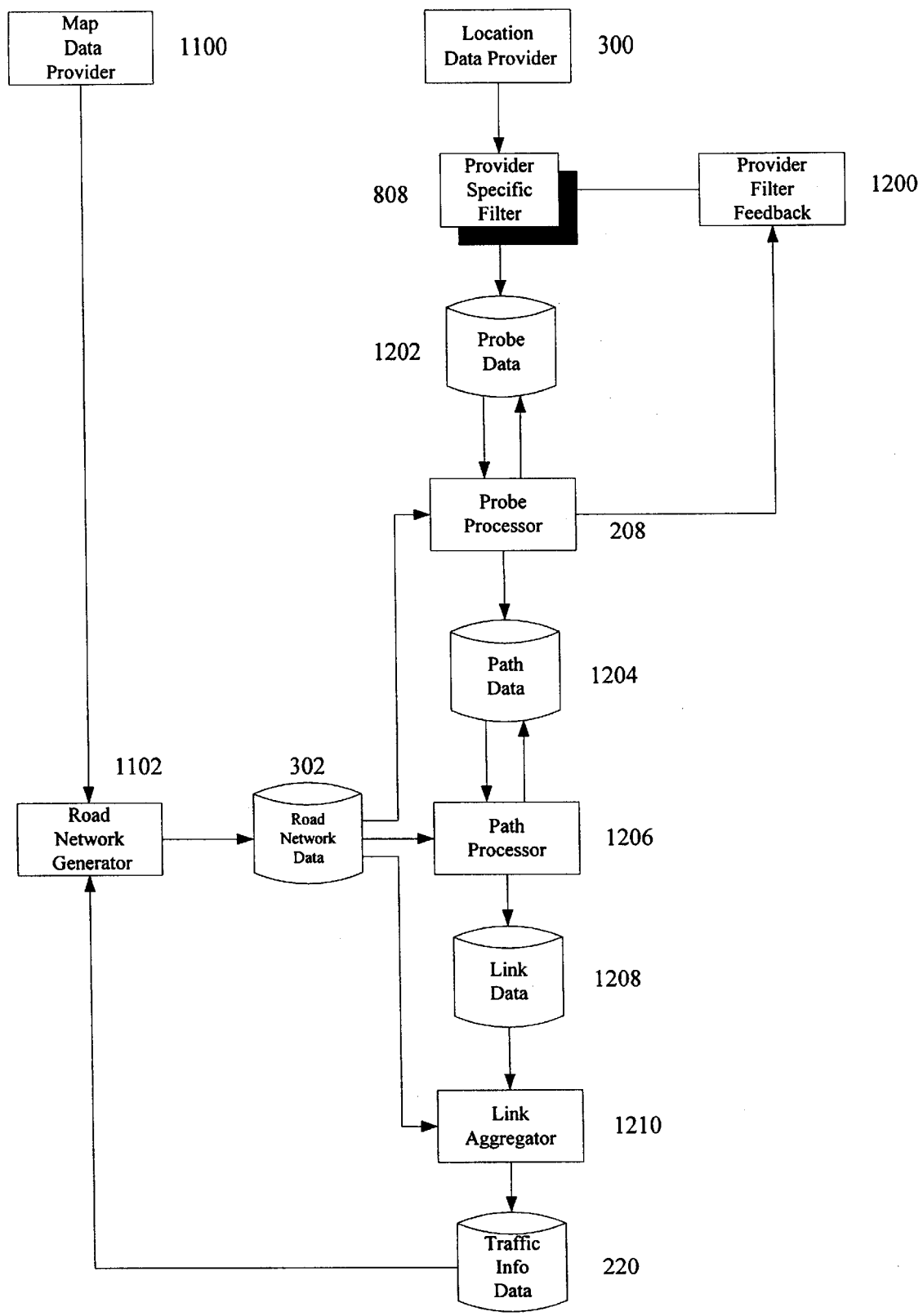
FIG. 12 is a flow chart depicting another exemplary embodiment of a system that can be used to generate traffic information.

With reference now to FIG. 12, another exemplary embodiment of a system 200 that can be used to generate traffic information is shown. This embodiment is similar to the embodiment shown in FIGS. 8 and 11, except that the present embodiment includes provider filter feedback 1200, probe data 1202, and the sequence including path data 1204, path processor 1206, link data 1208, and link aggregator 1210.

According to one aspect of the present embodiment, provider filter feedback 1200 can perform special testing, such as detecting when all traffic on a particular road segment has stopped or slowed substantially. As described above, provider specific filter 808 can eliminate current location measurements obtained from non-vehicle sources by detecting sequences of current location measurements that exhibit uncharacteristic vehicle behavior. Furthermore, as described above, a primary method that can be used to detect uncharacteristic vehicle behavior is to determine whether the source is moving at a sufficient speed. If a source has not moved in several minutes or if it is traveling consistently at a very slow speed, for example, less than 3 mph, it can be removed from the set of sources used to provide current location measurements. However, if the vehicle is stopped in traffic or moving very slowly due to traffic congestion, current location measurements from this vehicle should not be removed.

Accordingly, provider filter feedback 1200 can help detect when traffic on a particular road segment has stopped or slowed substantially. For instance, if a vehicle spends an unusually long amount of time, such as a minute or more in some applications, at about the same location, provider filter feedback 1200 can provide information about the vehicle, such as its current location measurements 212, the length of time spent at about the same location, and the like, along with information about other vehicles at or near the same location, to provider specific filter 808. Provider specific filter 808 can then compare information from multiple vehicles to determine whether other vehicles on a particular road segment are exhibiting similar delays. On the one hand, if other vehicles are exhibiting similar delays, the delay can be due to traffic conditions, and processing of the current location measurements 212 obtained from the vehicle can continue to be processed by the system. On the other hand, if other vehicles are not exhibiting similar delays, current location measurements 212 for the vehicle exhibiting a delay can be discarded. In particular, either some or all of the current location measurements 212 can be discarded depending on the application. Furthermore, in some applications, the vehicle itself can be removed from the system, and no further current location measurements can be obtained from this vehicle. In other applications, if a large number of vehicles is used to obtain traffic information in the area, the vehicle can be removed from the system for a limited period of time. In yet other applications, if a small number of vehicles is used to obtain traffic information in the area, the vehicle can remain in the system and traffic information obtained from the vehicle can be discarded until the vehicle begins to move normally, according to the traffic conditions.

According to another aspect of the present embodiment, the output from provider specific filter 808 can be a sequence of error corrected locations grouped by probe and ordered by time, and can be stored as probe data 1202. As described above regarding various embodiments, probe data 1202 can include a set of current possible positions and a set of stored possible paths for a probe or vehicle. Furthermore, probe data 1202 can be stored in a database for subsequent processing by probe processor 208, or it can be stored in memory and directly passed to probe processor 208.

Figure 13:
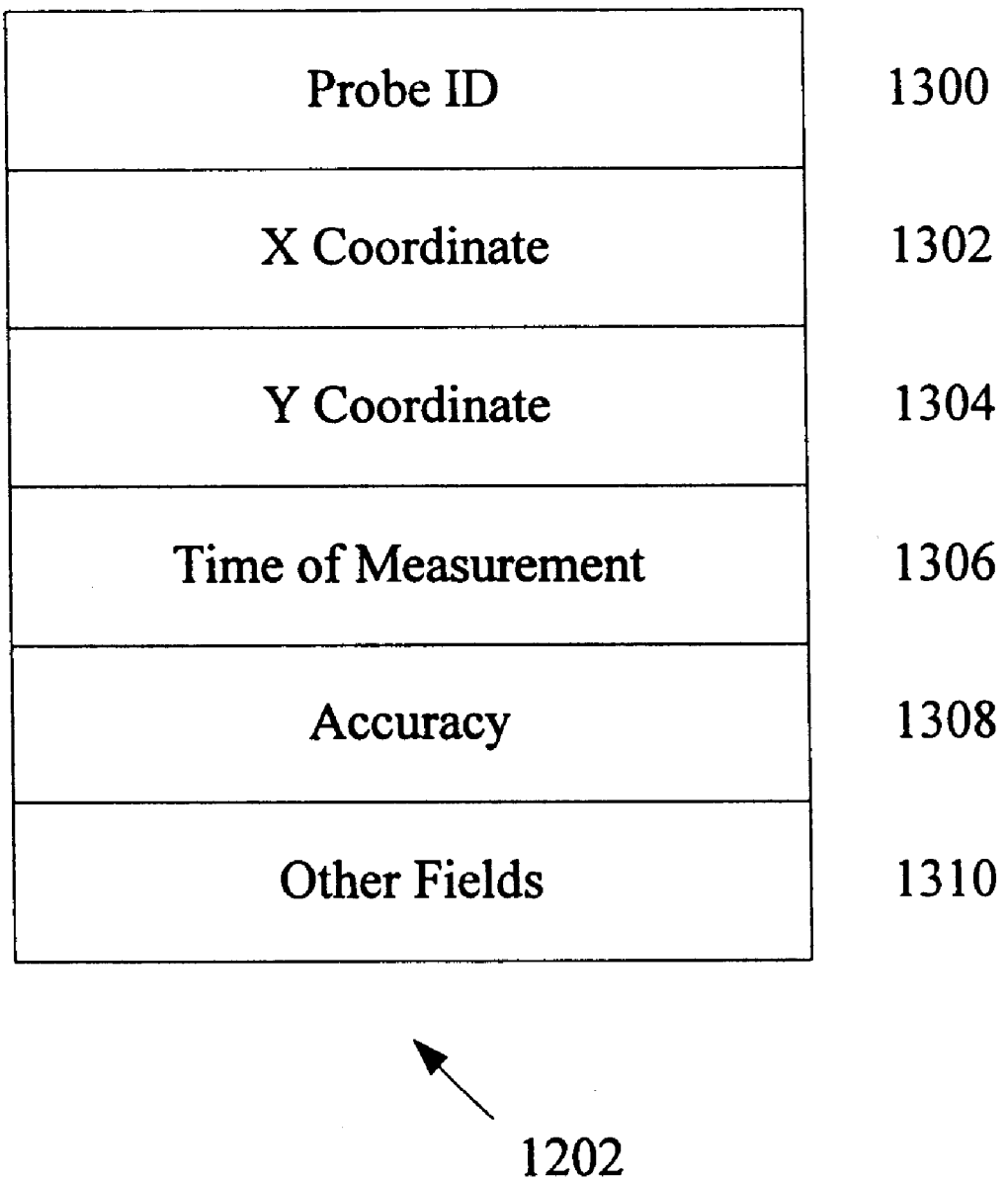
FIG. 13 depicts exemplary fields that can be stored as probe data.

With reference to FIG. 13, probe data 1202 can include data fields used to store information for each probe, such as probe identification 1300, X-coordinate location 1302, Y-coordinate location 1304, timestamp 1306, accuracy range 1308, and other fields 1310. More particularly, probe identification 1300 can be a unique number or identifier that is associated with a particular device or vehicle, such as a probe, throughout a series of current location measurements. Alternatively, non-unique identifiers can be used if the overlapping probe identification numbers are associated with probes that are geographically separated or if the risk of confusion is small relative to the number of probes being tracked. For example, when using a cellular phones as a probe, probe identification 1300 can be a variation of the probe's phone number or a variation of the unique hardware identifier built into the probe. Generally, probe identification 1300 can be used to differentiate current location measurements obtained from different probes or vehicles. For example, when filtering faulty current location measurements, as described above, each current location measurement can be associated with previous location measurements from the same vehicle, based on the probe identification 1300 included in the probe data 1202 or current location measurement 212.

Additionally, timestamp 1306 can be the amount of time, such as a number of seconds, between the time a current location measurement is generated by a probe and a base time or date. X and Y coordinates 1302 and 1304, respectively, can be represented in latitude and longitude, and can be converted to meters measured from the center of a map projection, if desired. Furthermore, accuracy range 1308 can be expressed in meters and can represent the radius of a circle centered at a current location measurement within which the actual position of a probe should be located.

As shown in FIG. 12, probe processor 208 can function as path generator 208 in other embodiments. For instance, each current location measurement can be passed from provider specific filter 808 to probe processor 208. Probe processor 208 can use road network data 116 to locate all links that are located within the accuracy range associated with the current location measurement and store these links as a set of current possible positions in probe data 1202. As described more fully above, probe processor 208 can then generate a new set of possible paths based on this set of current possible positions and a set of stored possible paths in probe data 1202. Furthermore, probe processor 208 can store information about any identified sub-paths or a single path stored in the set of stored possible paths as path data 1204, either in memory or to a database. Additionally, path data 1204 can include information such as probe identification, a sequence of links, associated current location measurements used to determine the sequence of links or single path, and the like.

According to yet another aspect of the present embodiment, the sequence including path data 1204, path processor 1206, link data 1208, and link aggregator 1210 can function together in a manner similar to road segment database 218 and road segment processor, as described above. In particular, after a sub-path is stored in path data 1204, path processor 1206 can use this sub-path and associated information, such as current location measurements used to generate this sub-path, timestamps, and the like, to calculate travel times and speeds on the road segments traversed by an individual vehicle. For instance, with reference again to FIG. 6, starting with the first road segment in the path traveled by a vehicle, the current location measurement closest to the starting end of the road segment can be selected. The timestamp for this current location measurement can then be subtracted from the timestamp corresponding to the current location measurement closest to the exiting end of the road segment to obtain the travel time for the vehicle across this road segment. The travel times and other calculations for various road segments along the path traveled by a vehicle can be stored in path data 1204 or local memory, along with the travel times and other calculations for other vehicles along various road segments.

Because the current location measurements are unlikely to be located exactly at the end points of a road segment, the travel time calculated for a road segment can be normalized by scaling the distance between the current location measurements to the total length of the road segment. The timestamps corresponding to the current location measurements can also be normalized in a similar manner. Additionally, the average speed on a road segment can be calculated by dividing the length of the road segment by the travel time.

Furthermore, if the road segments traveled are short or the current location measurements are highly inaccurate, a resulting error in the travel time calculations and magnitude of error can be reduced by using a travel time across a series of road segments. For example, if a road segment in the path is shorter than a specified length, such as 10 times the accuracy of the location measurements, the road segment can be added to the next road segment in the path. This procedure can be repeated until the total length of the series of road segments reaches or exceeds the specified length. The travel time along the series of road segments can then be calculated by using the current location measurements closest to the starting end of the first road segment and the exiting end of the last road segment in the series.

In addition, when a travel time is calculated for a series of road segments as described above, this combined travel time can be normalized by scaling the times to the lengths of the road segments in the series. For example, the vehicle can be assumed to travel at a constant speed over the series of road segments, with travel time apportioned proportionally to the road segments in the series. In particular, if the travel time is calculated as 40 seconds across a series of three road segments, which includes a first road segment that is 100 meters long, a second road segment that is 200 meters long, and a third road segment that is 100 meters long, the travel time for the first road segment is 10 seconds, the travel time for the second road segment is 20 seconds, and the travel time for the third road segment is 10 seconds. This procedure can provide more accurate travel times for the individual road segments as the total length of the series of road segments increases because any error can be averaged over a longer distance.

After the travel times and other calculations for various road segments along the path traveled by a vehicle are generated by path processor 1206, these calculations can be stored in link data database 1208 or local memory, along with the travel times and other calculations for other vehicles along various road segments. The calculations can include information such as vehicle identification, entry time, exit time, travel time, average speed, and the like.

In the present embodiment, link aggregator 122 can combine information from link data database 1208 from multiple probes to generate overall calculations for the individual road segments in a road network. For each road segment, the calculations for each vehicle that traversed that road segment during a specified time interval can be gathered from link data database 1208, and calculations such as average, median, distribution values, and the like, can be generated for both travel times and speeds on the road segment. In addition, delay can also be calculated for each road segment. For example, delay can be defined as the time difference between the current travel time on a particular road segment and the time a vehicle traveling at free flow speed would ideally take to traverse that road segment.

When information from multiple vehicles is used to generate calculations for a single road segment, link aggregator 1210 can analyze the distribution of speeds for multiple vehicles along the road segment to identify whether two distinct peaks appear in the distribution. These distinct peaks can suggest that two different lanes exist in the road segment and that the traffic flow differs in these two lanes. For example, traffic flow in a carpool lane may differ from traffic flow a mixed flow lane along the same road segment.

In the present embodiment, the final output from link aggregator 1210 can be a database of traffic information for the road segments in a road network. This database of traffic information can be stored in traffic information database 220. Some examples of the kinds of information that can be stored in traffic information database 220 can include travel time across each road segment, average speed across each road segment, delay on each road segment, separate values for each lane on a multi-lane road segment, and the like. The information stored in traffic information database 220 can be used as an area wide map of current travel conditions on road segments within a road network. Accordingly, system 200 (FIG. 2) can be used to determine traffic conditions in the road network, such as the current time to travel between any two points in the road network.

Although various aspects are described with respect to the present embodiment, it should be recognized that any one of these aspects or any combination of these aspects can be used. Additionally, with regard to the present embodiment, it should be noted that provider specific filter 808, probe processor 208, path processor 1206, and link aggregator 1210 can be included in processor 202 (FIG. 2).

Figure 14:
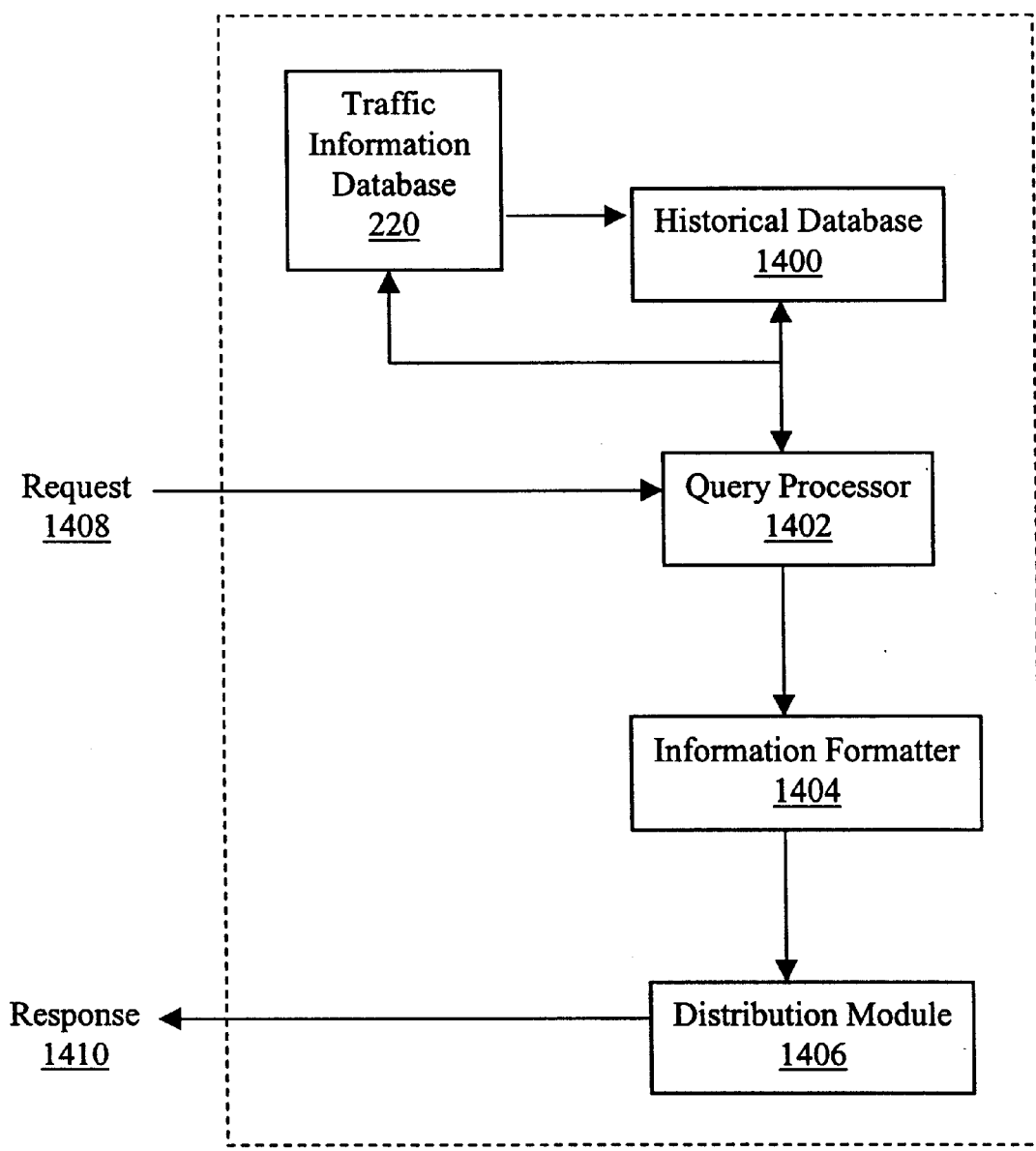
FIG. 14 depicts an exemplary embodiment of a system that can be used to retrieve generated traffic information.

With reference now to FIG. 14 and again to FIG. 2, in one exemplary embodiment, information stored in database 204, including any of the sub-databases, such as current location measurement 212, current possible positions 214, stored possible paths 216, road segment database 218, traffic information database 220, and the like, can be aggregated by time period and stored in historical database 1400. It should be recognized that other databases such as probe data 1202 (FIG. 12), path data 1204 (FIG. 12), and link data 1208 (FIG. 12) can also be stored in database 218 and historical database 1400. Furthermore, it should be recognized that only information from a single sub-database or certain sub-databases can be stored in historical database 1400 in some applications. For instance, in one preferred embodiment, information from traffic information database 220 can be stored in historical database 1400.

In the present exemplary embodiment, the information aggregated in historical database 1400 can be averaged for each time period. Accordingly, the historical database can include traffic information generated by system 200 (FIG. 2) that is organized in time intervals such as 5 minute, 15 minute, 1 hour, 4 hour, daily, day of week intervals, and the like. It should be recognized that any appropriate time interval or period can be used.

In the present embodiment, information stored in historical database 1400 can be retrieved in response to a request 1408 processed by query processor 1402. Query processor 1402 can provide a range of results from historical database 1400, based on a variety of input parameters. In some applications, query processor can also provide results directly from traffic information database 220. In particular, query processor can provide results such as the following:

1. Expected current trip time: Query processor 1402 can provide an expected current trip time based on an input of two location points. In particular, query processor 1402 can provide an expected amount of time to travel across a series of road segments that form the shortest path from one location point to the other, based on the most recent travel times stored in historical database 1400. For example, query processor 1402 can use the Dijkstra shortest path algorithm, with travel times as the weights on the individual road segments, to provide an expected current trip time. However, it should be recognized that any other shortest path algorithm using road segment weights can also be used.
2. Expected historical trip time: Query processor 1402 can provide an expected historical trip time based on an input of two location points, a date or day of the week, and a time. In particular, query processor 1402 can provide an expected amount of time to travel across a series of road segments that form the shortest path from one location point to the other, based on the travel times stored in historical database 1400 that match the inputted travel time and date or day of the week. For instance, given an input of Friday at 3:11 p.m., query processor 1402 can provide an expected historical trip time based on information stored in historical database 1400 for Friday during the 3:10 p.m. to 3:15 p.m. interval. In some applications, query processor 1402 can use the Dijkstra shortest path algorithm, with travel times as the weights on the individual road segments, to provide an expected historical trip time. However, it should be recognized that any other shortest path algorithm using road segment weights can also be used.
3. Expected current arrival time: Query processor 1402 can provide an expected current arrival time based on an input of a starting location point and a destination location point. In particular, query processor 1402 can calculate the expected current trip time for the two location points, as described above, and can add this current expected trip time to the current time to produce the expected time to arrive at the destination location point.
4. Expected historical arrival time: Query processor 1402 can provide an expected historical arrival time based on an input of a starting location point, a destination location point, and a starting time and date or day of the week. In particular, query processor 1402 can calculate the expected historical trip time for the two location points, as described above, and can add this expected historical trip time to the starting time to produce the expected time to arrive at the destination location point.
5. Expected current trip time along a route: Query processor 1402 can provide an expected current trip time along a route based on an input of two location points and a route between them that includes a series of road segments connecting the first location point to the second location point. In particular, the query processor can provide an expected amount of time to travel along the route, based on the most recent travel times stored in historical database 1400.
6. Expected historical trip time along a route: Query processor 1402 can provide an expected historical trip time along a route based on an input of two location points, a route between them that includes a series of road segments connecting the first location point to the second location point, and a date or day of the week and a time. In particular, query processor 1402 can provide an expected amount of time to travel along the route based on the travel times stored in historical database 1400 that match the travel time and date. For instance, given an input of Friday at 3:11 p.m., query processor 1402 can provide an expected historical trip time along a route based on information stored in historical database 1400 for Friday during the 3:10 p.m. to 3:15 p.m. interval.
7. Expected current arrival time along a route: Query processor 1402 can provide an expected current arrival time along a route based on an input of a starting location point, a destination location point, and a route between them. In particular, query processor 1402 can calculate the expected current trip time along the route, as described above, and can add this current expected trip time along the route to the current time to produce the expected time to arrive at the destination location point.

8. Expected historical arrival time along a route: Query processor 1402 can provide an expected historical arrival time along a route based on an input of a starting location point, a destination location point, a route between them, and a starting time and date or day of the week. In particular, query processor 1402 can calculate the expected historical trip time along the route, as described above, and can add this expected historical trip time along the route to the starting time to produce the expected time to arrive at the destination location point.

9. Unexpected delay on a road segment: Query processor 1402 can provide an unexpected delay on a road segment based on an input of a road segment. In particular, query processor 1402 can retrieve from historical database 1400 the most recently calculated current delay and the historical delay corresponding to the day of week and time that matches the current day of week and time. Query processor 1402 can then calculate and provide the unexpected delay on a road segment by subtracting the historical delay from the current delay. If the unexpected delay yields a negative value, query processor 1402 can provide an unexpected delay of zero.

10. Unexpected delay on a route: Query processor 1402 can provide an unexpected delay on a route based on an input of a route. In particular, query processor 1402 can calculate the unexpected delay on each road segment in the route. Then, query processor 1402 can provide the unexpected delay on the route by summing the unexpected delays for each of these road segments.

In the present embodiment, the results provided by query processor 1402 can be formatted by an information formatter 1404. In particular, information formatter 1404 can format the results into a form that is appropriate for a final distribution channel. Information formatter 1404 can then provide the formatted results to one or more distribution modules 1406. Depending on the final distribution channel desired, information formatter 1404 can produce formatted results such as the following:

1. Maps: Information formatter 1404 can provide a map of a desired area. In particular, information formatter 1404 can generate an image of the road segments located in the desired area. The image can include encoded information for each road segment, such as travel time, average speed, delay, unexpected delay, and the like, along each road segment. Information can be encoded on the map by highlighting the road segments and providing an associated legend. Road segments can be highlighted with different shades of color, different line widths, different line styles, and the like. The encoded information can reflect either current or historical values. In addition, particular routes can be shown on a map as a series of highlighted road segments.

2. Text: Information formatter 1404 can also provide text such as travel time along a route, travel time along a shortest route, arrival time along a route, arrival time along a shortest route, delay along a route, delay along a shortest route, unexpected delay along a route, unexpected delay along a shortest route, a route as an ordered list of road segments, directions as an ordered list of road segments with instructions about where to turn, and the like.

In the present embodiment, distribution module 1406 can provide an interface between information formatter 1404 and external distribution channels. In particular, distribution module 1406 can deliver information from information formatter 1404 to various devices in various forms such as: to web pages in the form of text, to web pages in the form of maps, to cellular phones in the form of text, to cellular phones in the form of voice, to cellular phones in the form of maps, to Personal Digital Assistants in the form of text, to Personal Digital Assistants in the form of voice, to Personal Digital Assistants in the form of maps, to in-vehicle displays in the form of text, to in-vehicle displays in the form of voice, to in-vehicle displays in the form of maps, to roadside displays in the form of text, to roadside displays in the form of maps, to kiosks in the form of text, to kiosks in the form of maps, to radios in the form of voice, to pagers in the form of text, and the like.

In addition, it should be recognized that query processor 1402, information formatter 1404, and distribution module 1406 can be included in processor 202 (FIG. 2).

Although the present invention has been described with respect to certain embodiments, examples, and applications, it will be apparent to those skilled in the art that various modifications and changes may be made without departing from the invention.

I claim:

1. A method of determining a path traveled by a vehicle in a road network having a plurality of road segments connected into a plurality of paths, the method comprising:
    obtaining a current location measurement for the vehicle, wherein said current location measurement has an accuracy range;
    determining the road segments located within said accuracy range of said current location measurement to form a set of current possible positions for the vehicle;
    retrieving a set of stored possible paths for the vehicle;
    generating a new set of possible paths based on said set of current possible positions and said set of stored possible paths; and
    storing said new set of possible paths as said set of stored possible paths,
    wherein said generating a new set of possible paths includes:
        extending each stored possible path to each current possible position to form a set of extended paths;
        storing each extended path that includes a current possible position that can be reached from the stored possible path in said extended path; and
        removing each extended path that includes a current possible position that cannot be reached from the stored possible path in said extended path.

2. The method of claim 1,
    wherein said storing includes storing each extended path that exists in the road network, and
    wherein said removing includes removing each extended path that does not exist in the road network.

3. The method of claim 1,
    wherein said set of current possible positions includes a first current possible position and a second current possible position;
    wherein said set of stored possible paths includes a first stored possible path and a second stored possible path; and
    wherein said extending includes:
        adding said first current possible position to said first stored possible path to form a first extended path,
        adding said second current possible position to said first stored possible path to form a second extended path, adding said first current possible position to said second stored possible path to form a third extended path, and adding said second current possible position to said second stored possible path to form a fourth extended path.

4. The method of claim 3, wherein said storing includes:

storing said first extended path if said first current possible position can be reached from said first stored possible path;

storing said second extended path if said second current possible position can be reached from said first stored possible path;

storing said third extended path if said first current possible position can be reached from said second stored possible path; and storing said fourth extended path if said second current possible position can be reached from said second stored possible path.

5. The method of claim 4, wherein said removing includes:

removing said first extended path if said first current possible position cannot be reached from said first stored possible path;

removing said second extended path if said second current possible position cannot be reached from said first stored possible path;

removing said third extended path if said first current possible position cannot be reached from said second stored possible path; and removing said fourth extended path if said second current possible position cannot be reached from said second stored possible path.

6. The method of claim 1, further comprising filtering said current location measurement.

7. The method of claim 6, wherein said set of stored possible paths includes a stored possible path having a previous current location measurement, wherein said previous current location measurement includes a first timestamp;

wherein said current location measurement includes a second timestamp; and wherein said filtering includes:

eliminating said current location measurement if the difference between said first timestamp and said second timestamp is less than a minimum travel time, storing said current location measurement if the difference between said first timestamp and said second timestamp is greater than said minimum travel time.

8. The method of claim 6, wherein said filtering includes eliminating said current location measurement if it is obtained from a non-vehicle source.

9. The method of claim 1, further comprising:

storing a sub-path that is common to all paths in said new set of possible paths, wherein said sub-path includes a common road segment;

removing road segments from each path in said new set of possible paths that precede said common road segment to form a set of shortened paths;

storing said set of shortened paths as said new set of possible paths; and storing said sub-path in a road segment database.

10. The method of claim 1, wherein said generating a new set of possible paths includes:

extending each stored possible path to each current possible position to form a set of extended paths;

storing each extended path having an available travel time that is greater than a minimum travel time; and removing each extended path having an available travel time that is less than said minimum travel time.

11. The method of claim 10, wherein said set of stored possible paths includes a stored possible path having a previous current location measurement, wherein said previous current location measurement includes a first timestamp;

wherein said current location measurement includes a second timestamp; and wherein said available travel time is the difference between said first timestamp and said second timestamp.

12. The method of claim 1, wherein said obtaining includes obtaining a location measurement from a probe.

13. The method of claim 12, wherein said probe is a GPS receiver.

14. The method of claim 12, wherein said probe is a cellular phone.

15. A method of determining a path traveled by a vehicle in a road network having a plurality of road segments connected into a plurality of paths, the method comprising:

obtaining a current location measurement for the vehicle, wherein said current location measurement has an accuracy range;

determining the road segments located within said accuracy range of said current location measurement to form a set of current possible positions for the vehicle;

retrieving a set of stored possible paths for the vehicle;

generating a new set of possible paths based on said set of current possible positions and said set of stored possible paths;

storing said new set of possible paths as said set of stored possible paths;

detecting when said set of stored possible paths includes a sub-path having a common road segment that is common to all paths in said set of stored possible paths; and storing said sub-path.

16. The method of claim 15, further comprising:

calculating a travel time for said common road segment; and storing said travel time in a road segment database, wherein said road segment database includes travel times from multiple vehicles.

17. The method of claim 16, further comprising:

calculating an average travel time for said common road segment using travel times from said road segment database; and storing said average travel time in a traffic information database.

18. The method of claim 17, further comprising:

receiving a request for an expected current trip time for said common road segment; and delivering a response based on said average travel time.

19. The method of claim 18, wherein said response is formatted.

20. The method of claim 18, wherein said response is provided to an external distribution channel.

21. The method of claim 17, further comprising:
storing said average travel time in a historical database, wherein said historical database includes travel times from multiple vehicles at various times;
receiving a request for an expected historical trip time for said common road segment; and
delivering a response based on travel times in said historical database.

22. The method of claim 17, further comprising:
receiving a request for an expected current arrival time for said common road segment; and
delivering a response based on said average travel time.

23. The method of claim 17, further comprising:
storing said average travel time in a historical database, wherein said historical database includes travel times from multiple vehicles at various times;
receiving a request for an expected historical arrival time for said common road segment; and
delivering a response based on travel times in said historical database.

24. The method of claim 17, wherein said traffic information database is further configured to store average travel times for a plurality of road segments in the road network.

25. The method of claim 24, further comprising:
receiving a request for an expected current trip time along a route; and
delivering a response based on said average travel times in said traffic information database.

26. The method of claim 24, further comprising:
receiving a request for an expected current arrival time along a route; and
delivering a response based on said average travel times in said traffic information database.

27. The method of claim 24, further comprising:
receiving a request for an unexpected delay on a route; and
delivering a response based on said average travel times in said traffic information database.

28. The method of claim 17, further comprising:
storing said average travel time in a historical database, wherein said historical database includes travel times from multiple vehicles at various times, wherein said historical database is configured to store travel times for a plurality of road segments in the road network;
receiving a request for an expected historical trip time along a route; and
delivering a response based on said travel times in said historical database.

29. The method of claim 17, further comprising:
storing said average travel time in a historical database, wherein said historical database includes travel times from multiple vehicles at various times, wherein said historical database is configured to store travel times for a plurality of road segments in the road network;
receiving a request for an expected historical arrival time along a route; and
delivering a response based on said travel times in said historical database.

30. The method of claim 16, further comprising:
calculating a median travel time for said common road segment using travel times from said road segment database; and
storing said median travel time in a traffic information database.

31. The method of claim 16, further comprising:
generating a distribution of travel times for said common road segment using travel times from said road segment database; and
storing said distribution in a traffic information database.

32. The method of claim 16, further comprising:
calculating a delay for said common road segment using travel times from said road segment database; and
storing said delay in a traffic information database.

33. The method of claim 32, further comprising:
receiving a request for an unexpected delay on said common road segment; and
delivering a response based on said delay in said traffic information database.

34. The method of claim 15, further comprising:
calculating a speed for said common road segment; and
storing said speed in a road segment database, wherein said road segment database includes speeds from multiple vehicles.

35. The method of claim 34, further comprising:
calculating an average speed for said common road segment using speeds from said road segment database; and
storing said average speed in a traffic information database.

36. The method of claim 34, further comprising:
calculating a median speed for said common road segment using speeds from said road segment database; and
storing said median speed in a traffic information database.

37. The method of claim 34, further comprising:
generating a distribution of speeds for said common road segment using speeds from said road segment database; and
storing said distribution in a traffic information database.

38. The method of claim 37, further comprising:
identifying a first peak in said distribution;
identifying a second peak in said distribution;
associating said first peak with a first lane in the road network; and
associating said second peak with a second lane in the road network.

39. A system for determining a path traveled by a vehicle along road segments in a road network, the system comprising:
a processor configured to:
receive a current location measurement for the vehicle,
determine the road segments located within an accuracy range of said current location measurement to form a set of current possible positions for said vehicle, and
generate a new set of possible paths based on said set of current possible positions and a set of stored possible paths for the vehicle; and
a database configured to:
store said set of stored possible paths for the vehicle, store said new set of possible paths as said set of stored possible paths, and store a sub-path that is common to all paths in said set of stored possible paths, wherein said sub-path includes a common road segment.

40. The system of claim 39, wherein said processor is further configured to filter said current location measurement.

41. The system of claim 39, wherein said processor is further configured to calculate a travel time for said common road segment;

wherein said database is further configured to store said travel time; and wherein said database is further configured to store travel times for said common road segment from multiple vehicles.

42. The system of claim 41, wherein said processor is further configured to calculate a speed for said common road segment;

wherein said database is further configured to store said speed; and wherein said database is further configured to store speeds for said common road segment from multiple vehicles.

43. The system of claim 42, wherein said processor is further configured to generate an overall calculation for said common road segment using travel times or speeds from said database; and wherein said processor is further configured to generate overall calculations using said travel times or speeds from said database for a plurality of road segments in the road network.

44. The system of claim 43, wherein said overall calculation is an average travel time.

45. The system of claim 43, wherein said overall calculation is a median travel time.

46. The system of claim 43, wherein said overall calculation is a distribution of travel times.

47. The system of claim 43, wherein said overall calculation is a delay.

48. The system of claim 47, wherein said processor is configured to receive a request for an unexpected delay on a route; and wherein said processor is configured to deliver a response based on said overall calculations.

49. The system of claim 43, wherein said processor is configured to receive a request for an expected current trip time for a shortest path connecting a first location point to a second location point; and wherein said processor is configured to deliver a response based on said overall calculations.

50. The system of claim 43, wherein said processor is configured to receive a request for an expected historical trip time for a shortest path connecting a first location point to a second location point; and wherein said processor is configured to deliver a response based on said overall calculations.

51. The system of claim 43, wherein said processor is configured to receive a request for an expected current arrival time for a shortest path connecting a first location point to a second location point; and wherein said processor is configured to deliver a response based on said overall calculations.

52. The system of claim 43, wherein said database is further configured to store overall calculations corresponding to various times for a plurality of road segments;

wherein said processor is configured to receive a request for an expected historical arrival time for a shortest path connecting a first location point to a second location point; and wherein said processor is configured to deliver a response based on said overall calculations.

53. The system of claim 43, wherein said processor is configured to receive a request for an expected current trip time along a route; and wherein said processor is configured to deliver a response based on said overall calculations.

54. The system of claim 43, wherein said database is further configured to store overall calculations corresponding to various times for a plurality of road segments;

wherein said processor is configured to receive a request for an expected historical trip time along a route; and wherein said processor is configured to deliver a response based on said overall calculations.

55. The system of claim 43, wherein said processor is configured to receive a request for an expected current arrival time along a route; and wherein said processor is configured to deliver a response based on said overall calculations.

56. The system of claim 43, wherein said database is further configured to store overall calculations corresponding to various times for a plurality of road segments;

wherein said processor is configured to receive a request for an expected historical arrival time along a route; and wherein said processor is configured to deliver a response based on said overall calculations.

* * * * *

UNITED STATES PATENT AND TRADEMARK OFFICE
CERTIFICATE OF CORRECTION

PATENT NO.    : 6,560,532 B2
DATED         : May 6, 2003
INVENTOR(S)   : Randall Cayford It is certified that error appears in the above-identified patent and that said Letters Patent is hereby corrected as shown below:

Column 25,
Line 52, "trip" should be -- arrival. --

Signed and Sealed this

Twenty-eighth Day of October, 2003

JAMES E. ROGAN
*Director of the United States Patent and Trademark Office*